United States Patent
Chang et al.

(10) Patent No.: US 9,370,695 B2
(45) Date of Patent: Jun. 21, 2016

(54) SPORT BALL CASING WITH THERMOPLASTIC REINFORCING MATERIAL

(71) Applicant: Nike, Inc., Beaverton, OR (US)

(72) Inventors: Chih-Chi Chang, Yun-Lin Hsien (TW); Yi-Jung Shen, Yun-Lin Hsien (TW); Scott R. Berggren, Portland, OR (US)

(73) Assignee: Nike, Inc., Beaverton, OR (US)

( * ) Notice: Subject to any disclaimer, the term of this patent is extended or adjusted under 35 U.S.C. 154(b) by 198 days.

(21) Appl. No.: 14/065,948

(22) Filed: Oct. 29, 2013

(65) Prior Publication Data

US 2014/0116602 A1     May 1, 2014

Related U.S. Application Data

(62) Division of application No. 13/170,858, filed on Jun. 28, 2011, now Pat. No. 8,597,144.

(51) Int. Cl.
*B29C 65/18* (2006.01)
*A63B 45/00* (2006.01)
(Continued)

(52) U.S. Cl.
CPC ............... *A63B 45/00* (2013.01); *A63B 41/10* (2013.01); *B29C 65/02* (2013.01); *B29C 65/18* (2013.01); *B29C 65/4815* (2013.01); *B29C 65/5057* (2013.01); *B29C 65/74* (2013.01); *B29C 65/743* (2013.01); *B29C 65/7808* (2013.01); *B29C 66/0326* (2013.01); *B29C 66/133* (2013.01); *B29C 66/24249* (2013.01); *B29C 66/4326* (2013.01); *B29C 66/7392* (2013.01); *B29C 66/81427* (2013.01); *B29C 66/83221* (2013.01); *B29D 22/04* (2013.01); *A63B 41/08* (2013.01); *B29C 65/04* (2013.01); *B29C 65/08* (2013.01);
(Continued)

(58) Field of Classification Search
CPC .......... A63B 45/00; A63B 45/02; B29C 65/18
USPC ............................................ 156/145, 156, 267
See application file for complete search history.

(56) References Cited

U.S. PATENT DOCUMENTS

| | | | |
|---|---|---|---|
| 414,748 | A | 11/1889 | Bentley |
| 1,517,859 | A | 12/1924 | O'Shea |

(Continued)

FOREIGN PATENT DOCUMENTS

| | | |
|---|---|---|
| BE | 535426 A | 7/1955 |
| CN | 103717273 A | 4/2014 |

(Continued)

OTHER PUBLICATIONS

International Search Report and Written Opinion mailed Mar. 8, 2013 in PCT/US2012/043635.

(Continued)

*Primary Examiner* — Jeff Aftergut
(74) *Attorney, Agent, or Firm* — Quinn Law Group, PLLC

(57) ABSTRACT

A sport ball may have a plurality of panels that are joined at seams to form a casing. The panels may include a thermoplastic polymer material applied to an interior side of the panels, and the thermoplastic polymer material may be heat-activated to extend across the seams. The ball may further include a bladder within the casing and an intermediate layer located between the casing and the bladder. The thermoplastic polymer material may also be heat-activated to bond with the intermediate layer or casing.

8 Claims, 19 Drawing Sheets

(51) Int. Cl.

| | | |
|---|---|---|
| *A63B 45/02* | (2006.01) | |
| *A63B 41/10* | (2006.01) | |
| *B29D 22/04* | (2006.01) | |
| *B29C 65/48* | (2006.01) | |
| *B29C 65/50* | (2006.01) | |
| *B29C 65/74* | (2006.01) | |
| *B29C 65/00* | (2006.01) | |
| *B29C 65/02* | (2006.01) | |
| *B29C 65/78* | (2006.01) | |
| *A63B 41/08* | (2006.01) | |
| *B29L 31/00* | (2006.01) | |
| *B29L 31/54* | (2006.01) | |
| *B29C 65/08* | (2006.01) | |
| *B29C 65/14* | (2006.01) | |
| *B29C 65/16* | (2006.01) | |
| *B29C 65/62* | (2006.01) | |
| *B29C 65/04* | (2006.01) | |

(52) U.S. Cl.
CPC .............. *B29C 65/14* (2013.01); *B29C 65/16* (2013.01); *B29C 65/62* (2013.01); *B29C 66/3452* (2013.01); *B29C 66/71* (2013.01); *B29C 66/721* (2013.01); *B29C 66/729* (2013.01); *B29C 66/81422* (2013.01); *B29L 2031/545* (2013.01); *B29L 2031/737* (2013.01); *Y10T 156/108* (2015.01)

(56) References Cited

U.S. PATENT DOCUMENTS

| | | | |
|---|---|---|---|
| 1,575,281 A | 3/1926 | Rosenberg | |
| 1,917,535 A | 7/1933 | Maynard | |
| 1,932,226 A | 10/1933 | Pierce | |
| 1,967,908 A | 7/1934 | Sneary | |
| 2,012,376 A | 8/1935 | Caro | |
| 2,018,559 A | 10/1935 | Horner | |
| 2,080,894 A | 5/1937 | Levinson | |
| 2,126,220 A | 8/1938 | Scudder | |
| 2,300,441 A | 11/1942 | Voit et al. | |
| 2,325,073 A | 7/1943 | Reach | |
| 2,344,638 A | 3/1944 | Reeder | |
| 2,945,693 A * | 7/1960 | Way ................ | A63B 39/00 156/145 |
| 3,512,777 A | 5/1970 | Henderson | |
| 4,154,789 A | 5/1979 | Delacoste | |
| 4,436,276 A | 3/1984 | Donahue | |
| 4,610,071 A | 9/1986 | Miller | |
| D322,105 S | 12/1991 | Ma | |
| 5,123,659 A | 6/1992 | Williams | |
| 5,181,717 A | 1/1993 | Donntag et al. | |
| 5,250,070 A | 10/1993 | Parodi | |
| 5,494,625 A | 2/1996 | Hu | |
| 5,503,699 A | 4/1996 | Ratner et al. | |
| 5,603,497 A | 2/1997 | Louez | |
| 5,752,890 A | 5/1998 | Shishido et al. | |
| 5,772,545 A | 6/1998 | Ou | |
| 5,888,157 A | 3/1999 | Guenther et al. | |
| 6,012,997 A | 1/2000 | Mason | |
| 6,142,897 A | 11/2000 | Lees | |
| 6,261,400 B1 | 7/2001 | Kennedy, III | |
| 6,302,815 B1 | 10/2001 | Shishido et al. | |
| 6,461,461 B2 | 10/2002 | Kennedy, III | |
| 6,629,902 B2 | 10/2003 | Murphy et al. | |
| 6,645,099 B2 | 11/2003 | Gaff et al. | |
| 6,685,585 B2 | 2/2004 | Shishido et al. | |
| 6,726,582 B1 | 4/2004 | Kuo et al. | |
| 6,971,965 B1 | 12/2005 | Shishido | |
| 6,991,569 B2 | 1/2006 | Dobrounig | |
| 7,005,025 B2 | 2/2006 | Summers | |
| 7,029,407 B2 | 4/2006 | Lee et al. | |
| 7,066,853 B2 | 6/2006 | Chang | |
| 2,073,766 A1 | 10/2008 | Suzuki | |
| 8,262,519 B2 * | 9/2012 | Raynak ............. | A63B 45/00 156/267 |
| 8,597,144 B2 | 12/2013 | Chang et al. | |
| 2002/0086749 A1 * | 7/2002 | Ou .................... | A63B 41/00 473/604 |
| 2003/0203780 A1 | 10/2003 | Guenther et al. | |
| 2003/0228946 A1 * | 12/2003 | Chan ................. | A63B 41/00 473/604 |
| 2004/0053717 A1 | 3/2004 | Awan | |
| 2004/0077288 A1 | 4/2004 | Krysiak et al. | |
| 2004/0144477 A1 | 7/2004 | Taniguchi et al. | |
| 2004/0229722 A1 | 11/2004 | Liu | |
| 2005/0081982 A1 | 4/2005 | Chen | |
| 2005/0229985 A1 | 10/2005 | Saxenfelt | |
| 2006/0063622 A1 | 3/2006 | Numberg et al. | |
| 2006/0068951 A1 | 3/2006 | Chang | |
| 2006/0229149 A1 | 10/2006 | Goedoen | |
| 2006/0293132 A1 | 12/2006 | Laliberty et al. | |
| 2007/0049434 A1 | 3/2007 | Maziarz et al. | |
| 2007/0225094 A1 * | 9/2007 | Nix .................. | A63B 41/08 473/605 |
| 2009/0325744 A1 | 12/2009 | Raynak | |
| 2009/0325745 A1 | 12/2009 | Rapaport et al. | |
| 2009/0325747 A1 | 12/2009 | Ou | |
| 2010/0240479 A1 | 9/2010 | Raynak | |
| 2012/0172160 A1 | 7/2012 | Marc | |
| 2013/0005520 A1 | 1/2013 | Chang et al. | |

FOREIGN PATENT DOCUMENTS

| | | |
|---|---|---|
| DE | 1 169 820 B | 5/1964 |
| DE | 10 2004 056 951 A1 | 6/2006 |
| EP | 0 598 542 A2 | 5/1994 |
| FR | 2 572 674 A1 | 5/1986 |
| GB | 1 555 634 A | 11/1979 |
| JP | 10-337341 A | 12/1998 |
| JP | 1189971 A | 4/1999 |
| WO | 2004/056424 A1 | 7/2004 |
| WO | 2013/003207 A2 | 1/2013 |

OTHER PUBLICATIONS

International Preliminary Report on Patentability dated Jan. 16, 2014 in PCT/US2012/043635.
Voluntary Amendments filed Jan. 21, 2014 in EP Application No. 12746148.1.
Voluntary Amendments filed Aug. 29, 2014 in European Patent Application No. 12746148.1.
Voluntary Amendments filed Jul. 21, 2014 in Chinese Patent Application No. 2012800315689.

* cited by examiner

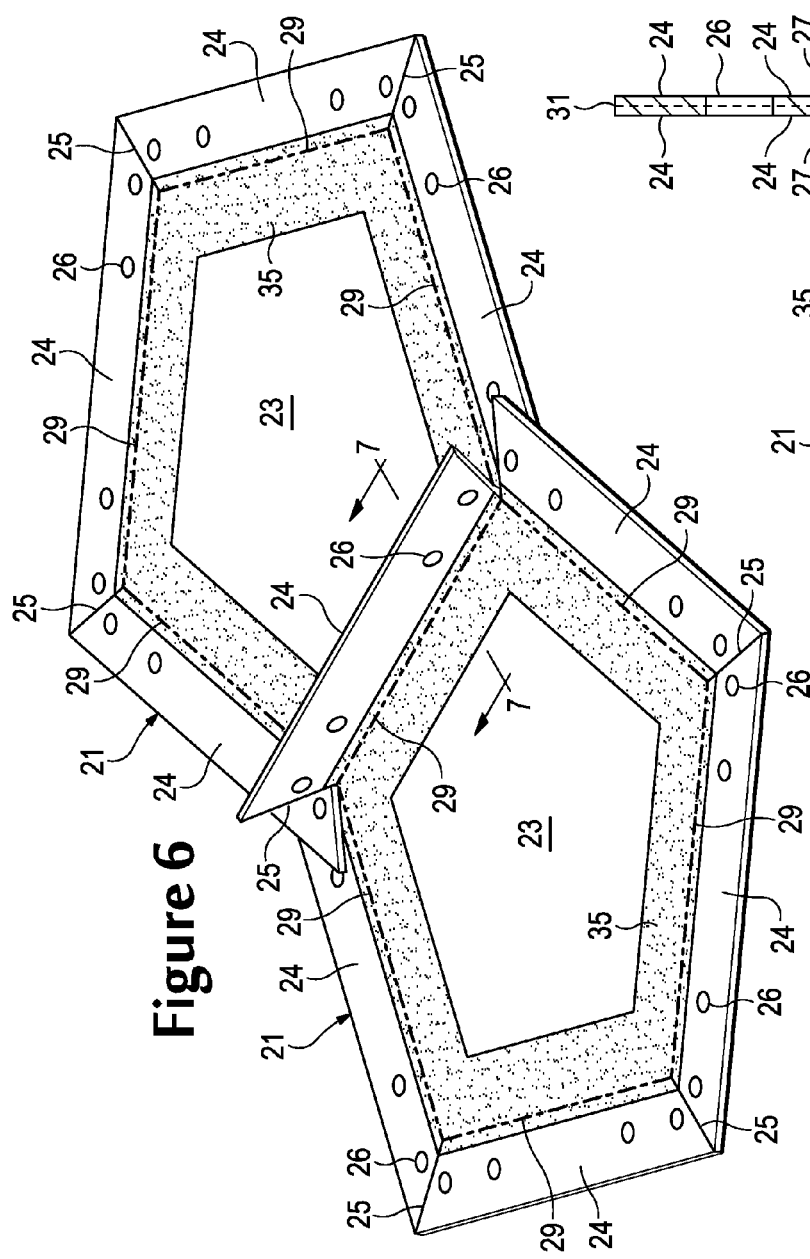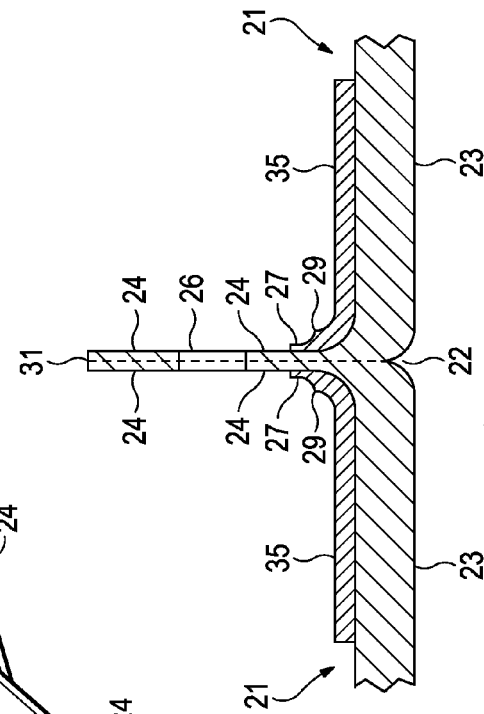

SPORT BALL CASING WITH THERMOPLASTIC REINFORCING MATERIAL

CROSS-REFERENCE TO RELATED APPLICATION

This application is a divisional of Chang et al., U.S. Patent Application Publication No. 2013/0005520, published on Jan. 3, 2013, entitled "Sport Ball Casing with Thermoplastic Reinforcing Material," the entire disclosure of which is incorporated herein by reference.

BACKGROUND

A variety of inflatable sport balls, such as a soccer ball, conventionally exhibit a layered structure that includes a casing, an intermediate layer, and a bladder. The casing forms an exterior portion of the sport ball and is generally formed from a plurality of durable and wear-resistant panels joined together along abutting edges (e.g., with stitching or adhesives). Although panel configurations may vary significantly, the casing of a traditional soccer ball includes thirty-two panels, twelve of which have a pentagonal shape and twenty of which have a hexagonal shape.

The intermediate layer forms a middle portion of the sport ball and is positioned between the casing and the bladder. Among other purposes, the intermediate layer may provide a softened feel to the sport ball, impart energy return, and restrict expansion of the bladder. In some configurations, the intermediate layer or portions of the intermediate layer may be bonded, joined, or otherwise incorporated into the casing as a backing material.

The bladder, which has an inflatable configuration, is located within the intermediate layer to provide an interior portion of the sport ball. In order to facilitate inflation (i.e., with pressurized air), the bladder generally includes a valved opening that extends through each of the intermediate layer and casing, thereby being accessible from an exterior of the sport ball.

SUMMARY

In one aspect, the disclosure sets forth a ball including a casing and a layer within the casing. The casing may be formed from a plurality of panels joined together at seams with a thermoplastic polymer material applied to an interior side of the casing adjacent to the seams. According to aspects set forth herein, the thermoplastic polymer material may be activated by heat.

In another aspect set forth herein, a ball includes a casing forming at least a portion of an exterior surface of the ball, and the casing includes an exterior side and an interior side. The casing further includes a first panel and a second panel, each with a thermoplastic polymer material layer on the interior side adjacent to an edge area, wherein the thermoplastic polymer material is configured to be activated by heat. The casing includes at least one seam joining an edge area of the first panel and an edge area of the second panel, and wherein the thermoplastic polymer material layers of the first and second panels have been heat-activated. The ball also includes a bladder located within the casing that may be pressurized with air.

In another aspect, a method of manufacturing a ball is disclosed. The method includes providing a plurality of casing panels, wherein an interior side of the casing panels includes a thermoplastic polymer material layer applied adjacent to edges of the casing panels, and wherein the thermoplastic polymer material is configured to be activated by heat. The method further includes joining the edges of the casing panels together to form an inverted casing, turning the casing right-side out through an aperture formed by at least one of the casing panels, inserting a bladder in the casing, inflating the bladder, and applying heat to the thermoplastic polymer material layer to activate the layer.

The advantages and features of novelty characterizing aspects of the invention are pointed out with particularity in the appended claims. To gain an improved understanding of the advantages and features of novelty, however, reference may be made to the following descriptive matter and accompanying figures that describe and illustrate various configurations and concepts related to the invention.

FIGURE DESCRIPTIONS

The foregoing Summary and the following Detailed Description will be better understood when read in conjunction with the accompanying figures.

FIG. 6 is a perspective view of two joined panels.

FIG. 7 is a cross-sectional view of the joined panels, as defined by section line 7-7 in FIG. 6.

DETAILED DESCRIPTION

The following discussion and accompanying figures disclose various sport ball configurations and methods relating to manufacturing of the sport balls. Although the sport ball is discussed and depicted in relation to a soccer ball, concepts associated with the configurations and methods may be applied to various types of inflatable sport balls. In addition to soccer balls, therefore, concepts discussed herein may be incorporated into basketballs, footballs (for either American football or rugby), volleyballs, and water polo balls, for example. A variety of non-inflatable sport balls, such as baseballs and softballs, may also incorporate concepts discussed herein.

Figure 1:
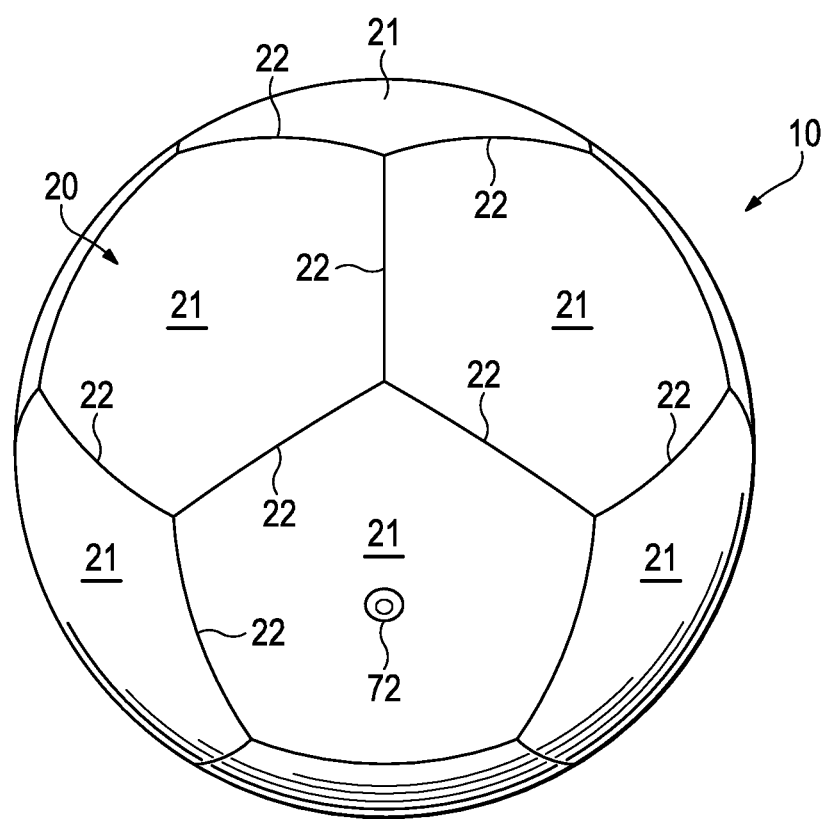
FIG. 1 is a perspective view of a sport ball.
Figure 2:
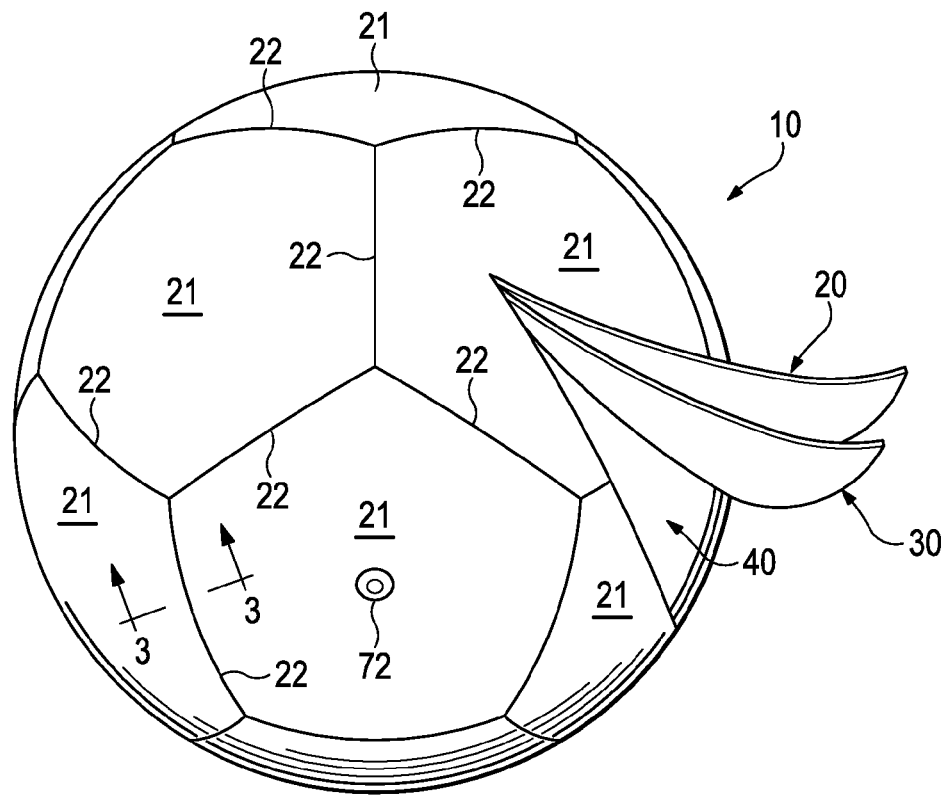
FIG. 2 is another perspective view of the sport ball.
Figure 3:
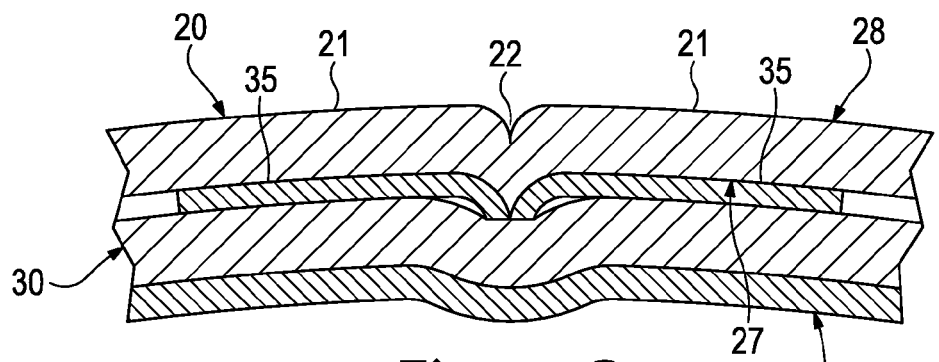
FIG. 3 is a cross-sectional view of a portion of the sport ball as defined by section line 3-3 in FIG. 2.

A sport ball 10 having the general configuration of a soccer ball is depicted in FIGS. 1-3. Ball 10 exhibits a layered structure having (a) a casing 20 that forms an exterior portion of ball 10, (b) an intermediate layer 30 located within casing 20, and (c) an inflatable bladder 40 that forms an interior portion of ball 10. Upon pressurization, bladder 40 induces ball 10 to take on a substantially spherical shape. More particularly, pressure within bladder 40 causes bladder 40 to place an outward force upon intermediate layer 30. In turn, intermediate layer 30 places an outward force upon casing 20. In order to limit expansion of bladder 40 and also limit tension in casing 20, a portion of intermediate layer 30 may have a limited degree of stretch. In other words, bladder 40 places an outward force upon intermediate layer 30, but the stretch characteristics of intermediate layer 30 effectively prevent the outward force from inducing significant tension in casing 20. Accordingly, intermediate layer 30 restrains pressure from bladder 40, while permitting outward forces to induce a spherical shape in casing 20, thereby imparting a spherical shape to ball 10.

Casing 20 is formed from various panels 21 that are joined together along abutting sides or edges to form a plurality of seams 22. As can be seen in FIG. 3, which depicts a cross-section of two joined panels 21, each panel 21 of the casing 20 has an exterior side 28 that ultimately forms the exterior of ball 10, as well as an interior side 27 which ultimately lies on the interior of ball 10. A hot-melt thermoplastic polymer layer 35, discussed in more detail below, may be applied along interior side 27. Although panels 21 are depicted as having the shapes of twelve equilateral pentagons, panels 21 may have non-equilateral shapes, concave or convex edges, or a variety of other shapes (e.g., triangular, square, rectangular, hexagonal, trapezoidal, round, oval, non-geometrical) that combine in a tessellation-type manner to form casing 20. In some configurations, ball 10 may have twelve pentagonal panels 21 and twenty hexagonal panels 21 to impart the general configuration of a traditional soccer ball. Selected panels 21 may also be formed of unitary (i.e., one piece) construction with adjacent panels 21 to form bridged panels that reduce the number of seams 22. Accordingly, the configuration of casing 20 may vary significantly.

The panels of conventional sport balls may be joined with stitching (e.g., hand or machine stitching). According to aspects described herein, a welding process may also be utilized in the manufacture of ball 10 to join panels 21 and form seams 22. More particularly, panels 21 are at least partially formed from a polymer material, which may be a thermoplastic polymer material, and edges of panels 21 may be heated and bonded to each other to form seams 22. An example of the configuration of seams 22 is depicted in the cross-section of FIG. 3, wherein the welding process has effectively secured, bonded, or otherwise joined two of panels 21 to each other by combining or comingling the polymer material from each of panels 21. In some configurations, some of panels 21 may be joined through stitching or various seams 22 may be supplemented with stitching or adhesives.

According to an embodiment described herein, ball 10 may also include provisions for adding strength and stability to seams 22, such as a hot-melt thermoplastic polymer layer 35 applied to an interior side 27 of panel 21. In general, a thermoplastic polymer material melts when heated and returns to a solid state when cooled. More particularly, the thermoplastic polymer material transitions from a solid state to a softened or liquid state when subjected to sufficient heat, and then the thermoplastic polymer material transitions from the softened or liquid state to the solid state when sufficiently cooled. Referring to FIG. 3, hot-melt layer 35 may provide additional bonding along seam 22 as described in greater detail below. Additionally, hot-melt layer 35 may bond casing 20 to intermediate layer 30.

One advantage of utilizing a welding process to form seams 22 relates to the overall mass of ball 10. Whereas approximately ten to fifteen percent of the mass of a conventional sport ball may be from the seams between panels, welding panels 21 may reduce the mass at seams 22. By eliminating stitched seams in casing 20, the mass that would otherwise be imparted by the stitched seams may be utilized for other structural elements that enhance the performance properties (e.g., energy return, spherical shape, mass distribution, durability, aerodynamics) of ball 10. Another advantage relates to manufacturing efficiency. Stitching each of the seams of a conventional sport ball is a relatively time-consuming process, particularly when hand stitching is utilized. By welding panels 21 together at seams 22, the time necessary for forming casing 20 may be decreased, thereby increasing the overall manufacturing efficiency.

Intermediate layer 30 is positioned between casing 20 and bladder 40 and may be formed to include one or more of a compressible foam layer that provides a softened feel to the sport ball, a rubber layer that imparts energy return, and a restriction layer to restrict expansion of bladder 40. The overall structure of intermediate layer 30 may vary significantly. As an example, the restriction layer may be formed from (a) a thread, yarn, or filament that is repeatedly wound around bladder 40 in various directions to form a mesh that covers substantially all of bladder 40, (b) a plurality of generally flat or planar textile elements stitched together to form a structure that extends around bladder 40, (c) a plurality of generally flat or planar textile strips that are impregnated with latex and placed in an overlapping configuration around bladder 40, or (d) a substantially seamless spherically-shaped textile. In some configurations of ball 10, intermediate layer 30 or portions of intermediate layer 30 may also be bonded, joined, or otherwise incorporated into casing 20 or intermediate layer 30 may be absent from ball 10. Accordingly, the structure of intermediate layer 30 may vary significantly to include a variety of configurations and materials.

Bladder 40 has an inflatable configuration and is located within intermediate layer 30 to provide an inner portion of ball 10. When inflated, bladder 40 exhibits a rounded or generally spherical shape. In order to facilitate inflation, bladder 40 may include a valved opening (not depicted) that extends through intermediate layer 30 and casing 20, thereby being accessible from an exterior of ball 10, or bladder 40 may have a valve-less structure that is semi-permanently inflated. Bladder 40 may be formed from a rubber or carbon latex material that substantially prevents air or other fluids within bladder 40 from diffusing to the exterior of ball 10. In addition to rubber and carbon latex, a variety of other elastomeric or otherwise stretchable materials may be utilized for bladder 40. Bladder 40 may also have a structure formed from a plurality of joined panels, as disclosed in U.S. Patent Application Publication Number 2009/0325745 A1, filed in the U.S. Patent and Trademark Office on 27 Jun. 2008, which is entirely incorporated herein by reference.

Figure 4:
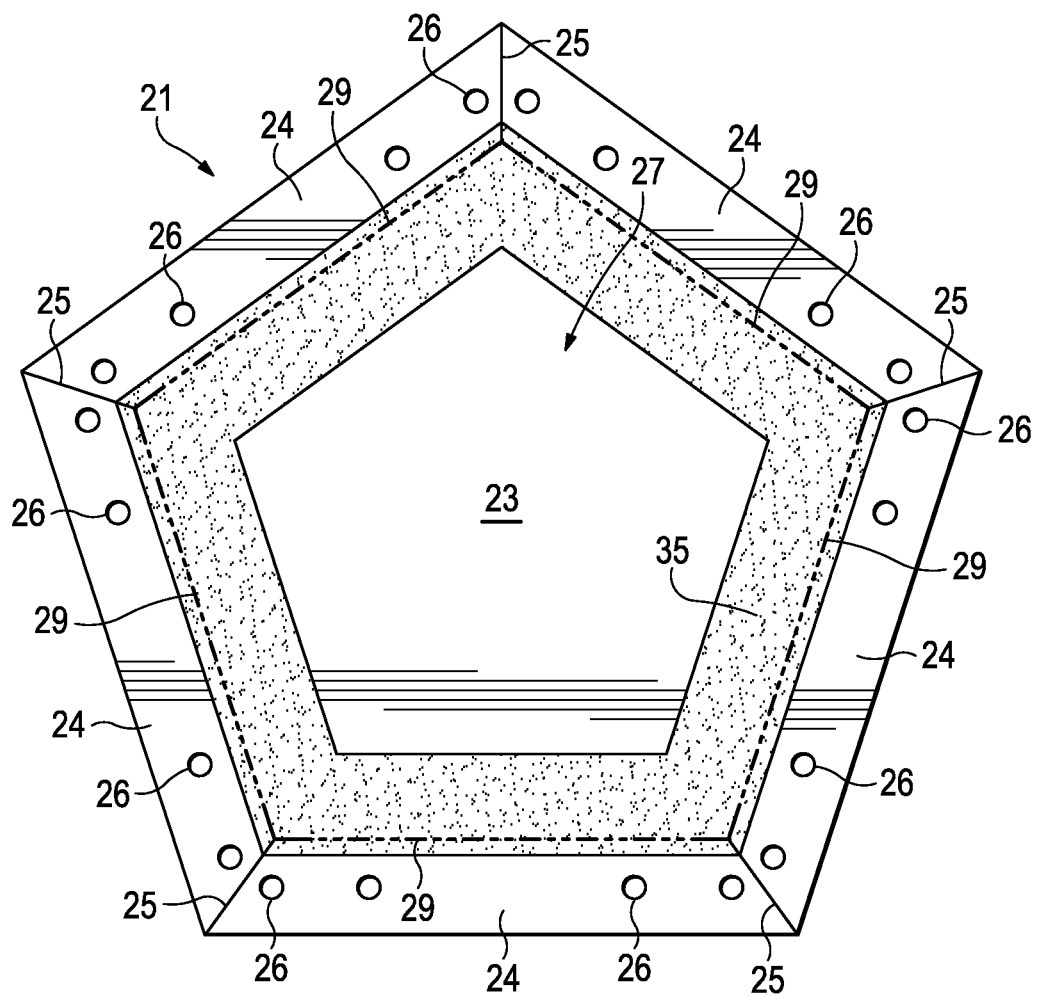
FIG. 4 is a plan view of an interior side of a panel of the sport ball.

The panels of conventional sport balls, as discussed above, may be joined with stitching (e.g., hand or machine stitching). Panels 21 are, however, at least partially formed from a polymer material, which may be a thermoplastic polymer material that can be joined through the welding process. Referring to FIG. 4, an interior side 27 of one of panels 21 prior to incorporation into ball 10 is depicted as having a panel area 23 and five flange areas 24. Whereas panel area 23 generally forms a central portion of panel 21, flange areas 24 form an edge portion of panel 21 and extend around panel area 23. For purposes of reference, dashed lines 29 are depicted as extending between panel area 23 and the various flange areas 24. Panel 21 has a pentagonal shape and each of flange areas 24 correspond with one side region of the pentagonal shape. In further configurations where a panel has a different shape, the number of flange areas may change to correspond with the number of sides of the shape. Panel 21 defines five incisions 25 that extend inward from vertices of the pentagonal shape and effectively separate the various flange areas 24 from each other. Incisions 25 extend entirely through the thickness of panels 21 to disconnect flange areas 25 from each other and permit flange areas 24 to flex or otherwise move independent of each other, although flange areas 24 remain connected to panel area 23. Additionally, each flange area 24 defines various registration apertures 26 that form holes extending through panel 21.

Panels 21 may further include a thermoplastic hot-melt layer 35 applied to interior side 27 to ultimately facilitate and strengthen the bonding of panels 21 to one another. According to the embodiment depicted in FIG. 4, hot-melt layer 35 is deposited adjacent to reference line 29, along the outward edges of panel 23 and along the inward edges of the five flange areas 24, forming a hollow pentagonal shape that crosses dashed reference line 29 between panel 23 and flange areas 24. As discussed in more detail below, when panels 23 are welded or otherwise joined together to form casing 20, reference line 29 approximates a seam line 22 between panels. Thus, according to the embodiment depicted in FIG. 4, hot-melt layer 35 abuts and extends along an approximate seam (reference line 29) between panels 21, both on the panel 23 side and the flange 24 side, facilitating a bond at the seam. However, as noted above, the panels may be configured using many different shapes, and thus the hot-melt layer 35 applied to the interior side 27 may also take on various shapes.

Thermoplastic hot-melt layer 35 may include a thermoplastic polymer material. As noted above, a thermoplastic polymer material transitions from a solid state to a softened or liquid state when subjected to sufficient heat, and then the thermoplastic polymer material transitions from the softened or liquid state to the solid state when sufficiently cooled. Thermoplastic polymer materials may also be welded or heat bonded, as described in greater detail below, to other textile elements, plates, sheets, polymer foam elements, thermoplastic polymer elements, thermoset polymer elements, or a variety of other elements formed from various materials. Thus, as set forth in more detail below, when panels 21 are welded together and heat is applied, hot-melt layer 35 may provide an additional bond to interior side 27 of panel 21, to intermediate layer 30 or bladder 40, as well as across seam 22. Although a wide range of thermoplastic polymer materials may be utilized for hot-melt layer 35, examples of some suitable thermoplastic polymer materials include thermoplastic polyurethane, polyamide, polyester, polypropylene, polyolefin, and rubber. In some configurations, the thermoplastic polymer materials of hot-melt layer 35 may be sheets or layers that are bonded to interior side 27. In other configurations, the thermoplastic polymer materials of hot-melt layer 35 may be a liquid polymer or uncured polymer resin that is deposited upon interior side 27 through spraying and then solidified or cured. That is, a spray polymer may be applied to interior side 27 to form hot-melt layer 35. Accordingly, the materials forming hot-melt layer 35 and the manner in which the materials are applied may vary significantly.

Figure 5A:
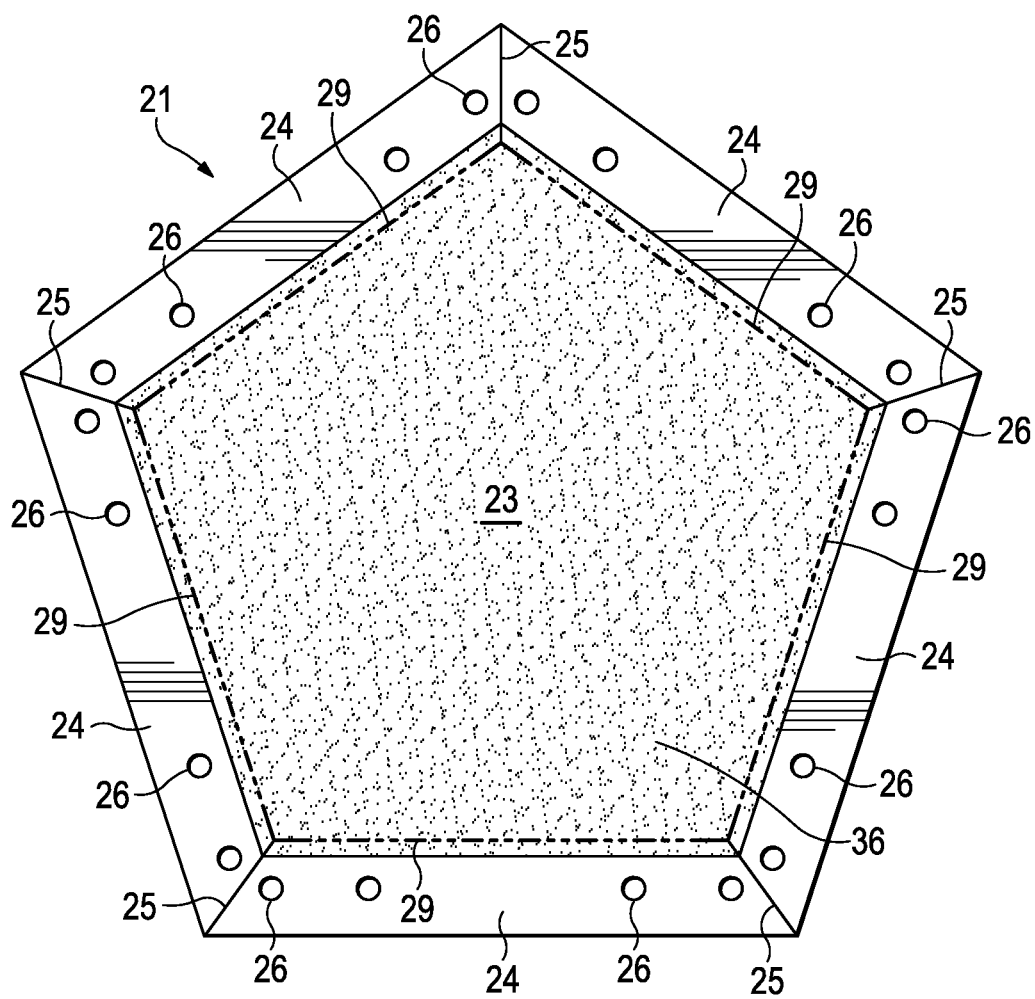
FIGS. 5A-5C are plan views of additional configurations of an interior side of the panel.
Figure 5B:
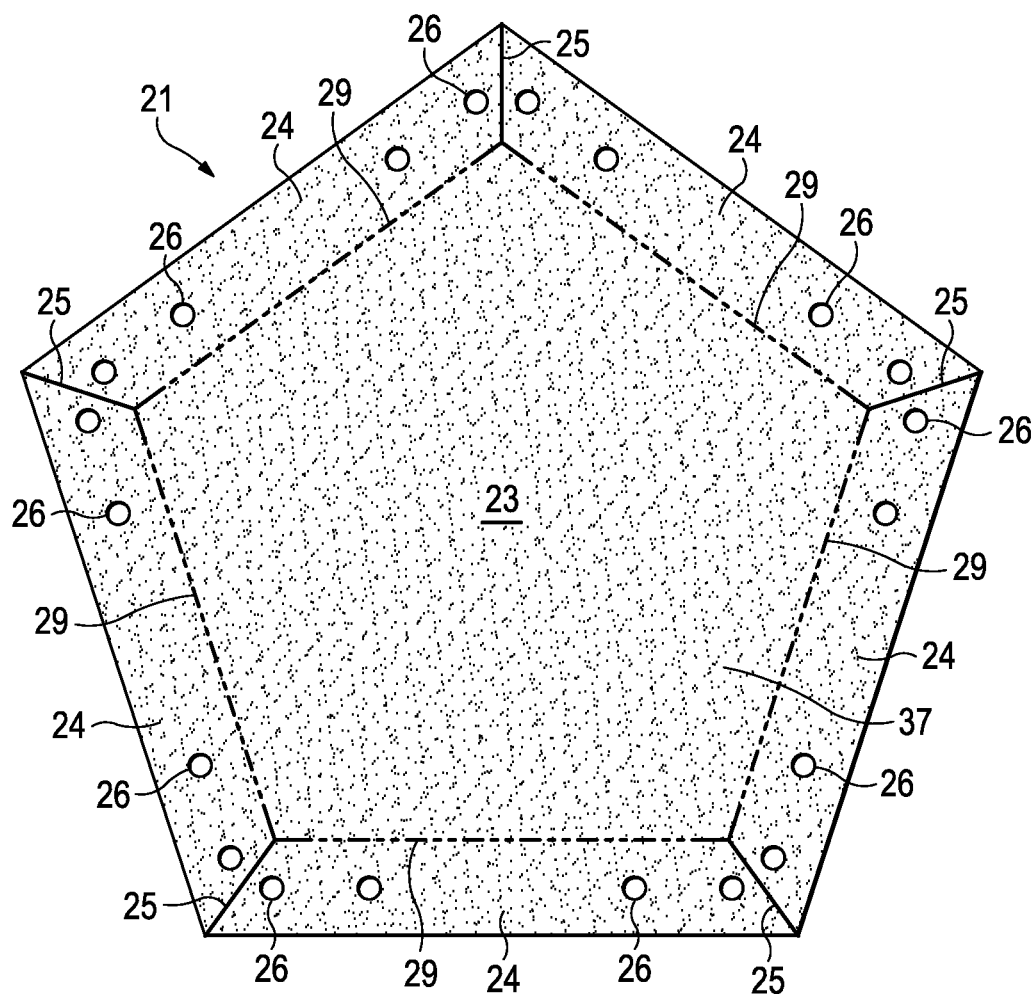
Figure 5C:
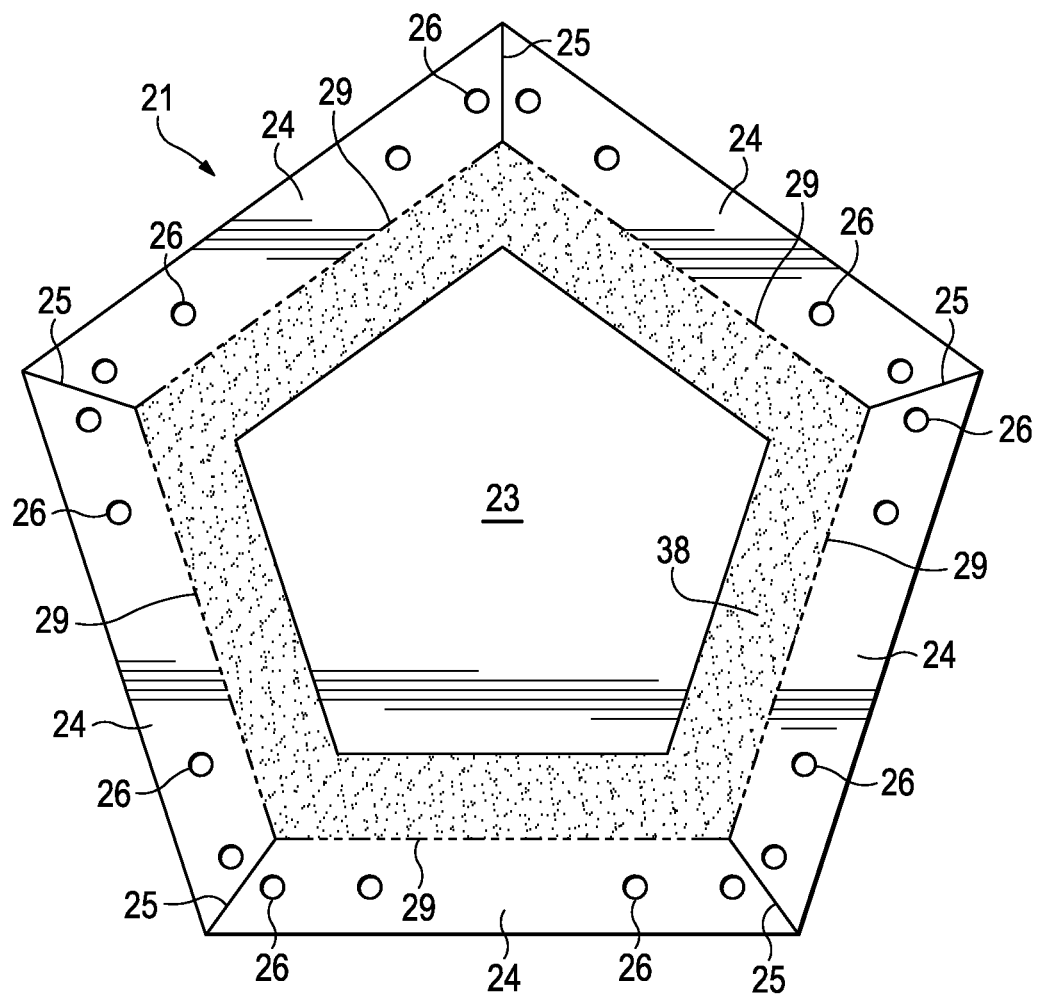

A hot-melt layer may be applied to interior side 27 of panel 21 in a variety of configurations according to additional embodiments set forth herein. Alternative configurations of the hot-melt layer may present efficiencies in manufacturing and may provide additional strength across panels 21. FIGS. 5A-5C depict plan views of additional configurations of embodiments of an interior side 27 with a hot-melt layer as set forth herein. In FIG. 5A, hot-melt layer 36 extends over entire panel 23, across reference line 29 and along the inside edge of flanges 24. Once heat-activated, hot-melt layer 36 may provide additional strength and bonding across a seam between panels 21 (approximately at reference line 29), and may also provide additional integrity to panel 21 as a whole.

A hot-melt layer may also be applied to the interior side 27 of an entire panel 21, as depicted in FIG. 5B as hot-melt layer 37. According to the embodiment, hot-melt layer 37 may be applied across the entirety of both panel 23 and flanges 24. Such a configuration may provide added strength across an entire bonded panel 21 as well as present efficiencies in application of the hot-melt layer 37 to the panel. Once heat-activated, hot-melt layer 37 may provide additional strength and bonding across a seam between panels 21 (approximately at reference line 29), and may also provide additional integrity to panel 21 as a whole.

A hot-melt layer configuration 38 presented in the embodiment of FIG. 5C is yet another configuration of a hot-melt layer applied to interior side 27 of panel 21. According to the embodiment depicted in FIG. 5C, hot-melt layer 38 is deposited adjacent to reference line 29, along the outward edges of panel 23, forming a hollow pentagonal shape that lies adjacent to, but does not cross dashed reference line 29 between panel 23 and flange areas 24. As discussed in more detail below, reference line 29 approximates a seam line 22 between panels, and thus, according to the embodiment depicted in FIG. 5C, hot-melt layer 38 abuts and extends along an approximate seam (reference line 29) between panels 21 on the panel 23 side, facilitating a bond at the seam.

The hot-melt layer as described above may be applied in a number of different configurations to a panel 21 and still fall within the spirit and scope of the present disclosure. Further, it is understood that the hot-melt layer set forth herein is not limited to any of the aforementioned configurations, and the hot-melt layer may be configured in a variety of ways and may be applied in a variety of different configurations, in addition to the configurations discussed herein. For simplicity, the remainder of the description will refer to the hot-melt layer 35 configuration as presented in FIG. 4, however, the foregoing principles may be applied to a variety of configurations.

Panel areas 23 of the various panels 21 form a majority, or all, of the portion of casing 20 that is visible on the exterior of ball 10. Flange areas 24, however, form portions of panels 21 that are bonded together to join panels 21 to each other. Additionally, portions of flange areas 24 may be trimmed or otherwise removed during a manufacturing process for ball 10, as described below. Referring to FIGS. 6 and 7, an example of the manner in which two panels 21 are joined to each other is depicted. Although panel areas 23 are generally co-planar with each other, the joined flange areas 24 bend upward and are joined along abutting surfaces. Dashed reference line 31 in FIG. 7 denotes where the flanges of panels 21 join together. Additionally, registration apertures 26 from each of the joined flange areas 24 are aligned. By aligning registration apertures 26 prior to bonding (i.e., through welding), flange areas 24 are properly positioned relative to each other. As discussed in greater detail below, portions of the joined flange areas 24 may be trimmed during the manufacturing process for casing 20 exposing hot-melt layer 35 along reference line 29 for hot-melt bonding across seam 22. Note that the upwardly-facing surfaces in FIGS. 6 and 7 are located on an interior of ball 10 once manufacturing is completed, and downwardly-facing surfaces form an exterior surface of ball 10.

Panels 21 are discussed above as including a polymer material, which may be utilized to secure panels 21 to each other. Examples of suitable polymer materials for panels 21 include thermoplastic and/or thermoset polyurethane, polyamide, polyester, polypropylene, and polyolefin. In some configurations, panels 21 may incorporate filaments or fibers that reinforce or strengthen casing 20. In further configurations, panels 21 may have a layered structure that includes an outer layer of the polymer material and an inner layer formed from a textile, polymer foam, or other material that is bonded with the polymer material.

When exposed to sufficient heat, the polymer materials within panels 21 transition from a solid state to either a softened state or a liquid state, particularly when a thermoplastic polymer material is utilized. When sufficiently cooled, the polymer materials then transition back from the softened state or the liquid state to the solid state. Based upon these properties of polymer materials, welding processes may be utilized to form a weld that joins portions of panels 21 (i.e., flange areas 24) to each other. As utilized herein, the term "welding" or variants thereof is defined as a securing technique between two elements that involves a softening or melting of a polymer material within at least one of the elements such that the materials of the elements are secured to each other when cooled. Similarly, the term "weld" or variants thereof is defined as the bond, link, or structure that joins two elements through a process that involves a softening or melting of a polymer material within at least one of the elements such that the materials of the elements are secured to each other when cooled. As examples, welding may involve (a) the melting or softening of two panels 21 that include polymer materials such that the polymer materials from each panel 21 intermingle with each other (e.g., diffuse across a boundary layer between the polymer materials) and are secured together when cooled and (b) the melting or softening a polymer material in a first panel 21 such that the polymer material extends into or infiltrates the structure of a second panel 21 (e.g., infiltrates crevices or cavities formed in the second panel 21 or extends around or bonds with filaments or fibers in the second panel 21) to secure the panels 21 together when cooled. Welding may occur when only one panel 21 includes a polymer material or when both panels 21 include polymer materials. Additionally, welding does not generally involve the use of stitching or adhesives, but involves directly bonding panels 21 to each other with heat. In some situations, however, stitching or adhesives may be utilized to supplement the weld or the joining of panels 21 through welding. Still in other embodiments, panels 21 may be joined by stitching, e.g., by stitching along reference line 29, and the seam reinforced by hot-melt layer 35, as discussed in more detail below.

Figure 8:
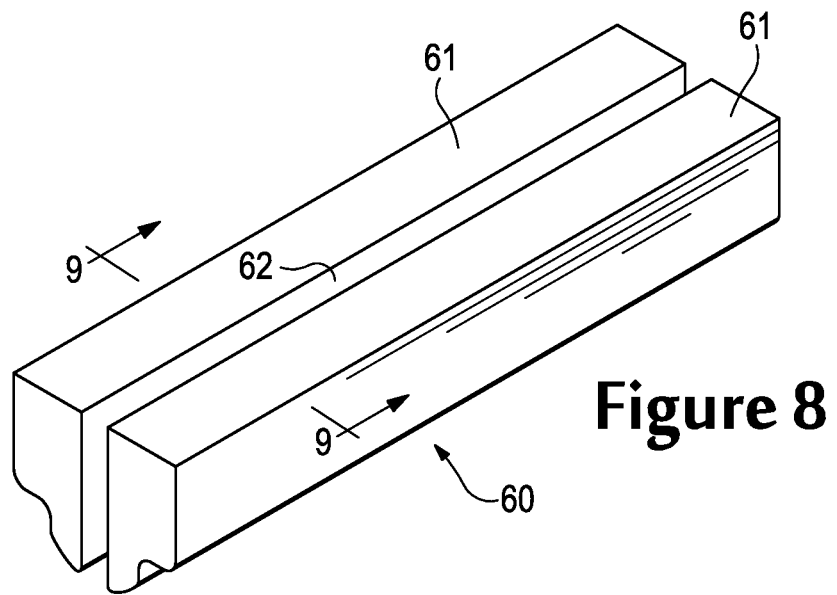
FIG. 8 is a perspective view of a welding tool utilized in joining the panels.
Figure 9:
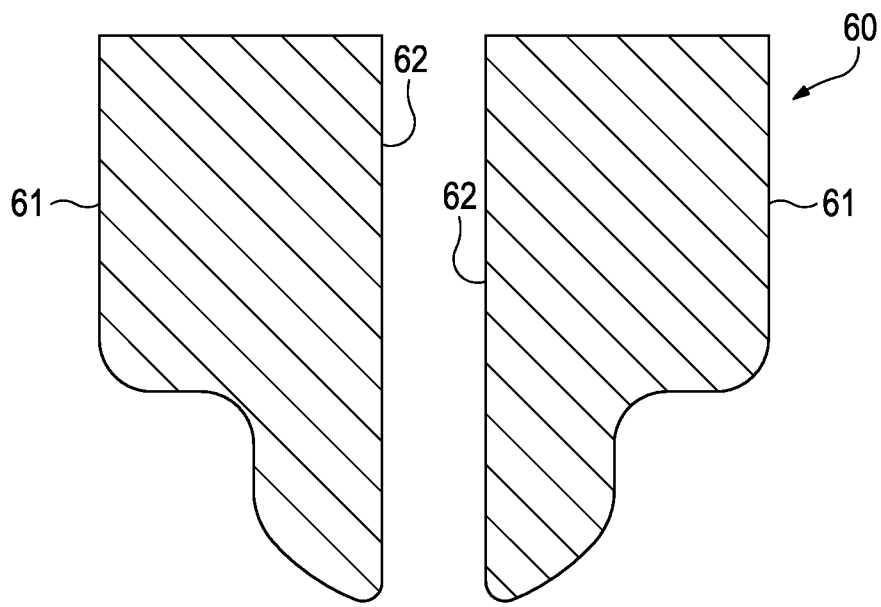
FIG. 9 is a cross-sectional view of the welding tool, as defined by section line 9-9 in FIG. 8.

A variety of techniques may be utilized to weld flange areas 24 to each other, including conduction heating, radiant heating, radio frequency (RF) heating, ultrasonic heating, and laser heating. An example of a welding die 60 that may be utilized to form seams 22 by bonding two flange areas 24 is depicted in FIGS. 8 and 9. Welding die 60 includes two portions 61 that generally correspond in length with a length of one of the sides of panels 21. That is, the length of welding die 60 is generally as long as or longer than the lengths of flange areas 24. Each portion 61 also defines a facing surface 62 that faces the other portion 61. That is, facing surfaces 62 face each other. If utilized for purposes of conduction heating, for example, portions 61 may each include internal heating elements or conduits that channel a heated liquid in order to sufficiently raise the temperature of welding die 60 to form a weld between flange areas 24. If utilized for purposes of radio frequency heating, one or both of portions 61 may emit radio frequency energy that heats the particular polymer material within panels 21. In addition to welding die 60, a variety of other apparatuses that may effectively form a weld between panels 21 may be utilized.

Figure 10A:
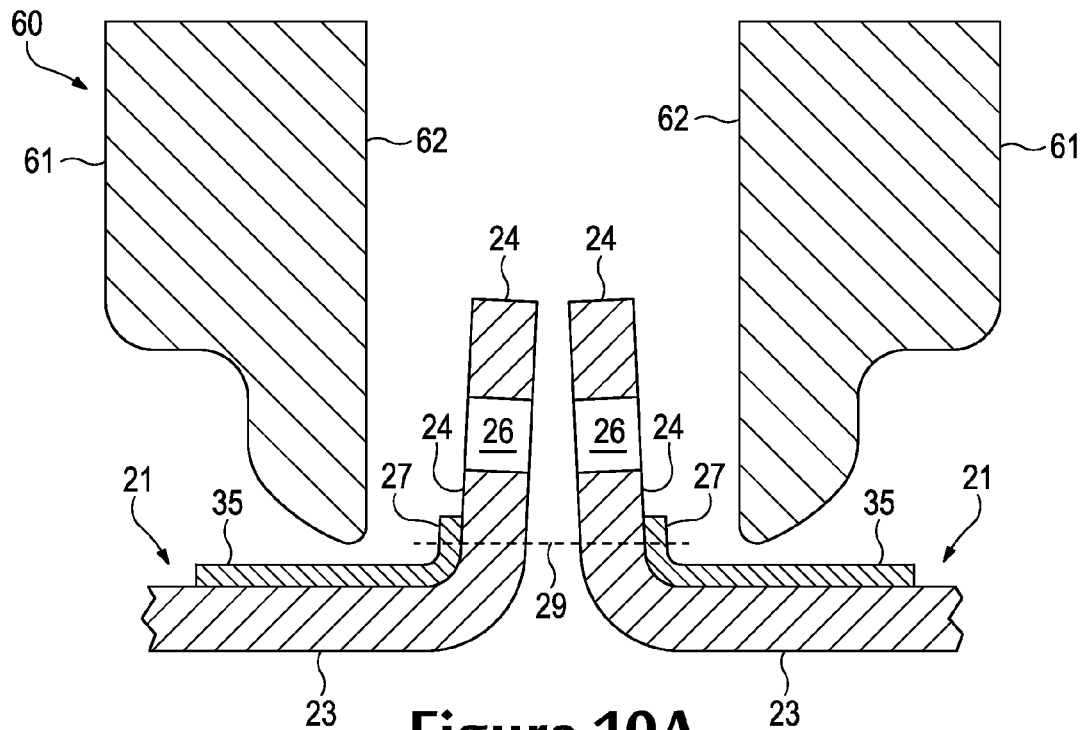
FIGS. 10A-10E are schematic cross-sectional views illustrating steps of welding the panels together in a manufacturing process for the sport ball.
Figure 10B:
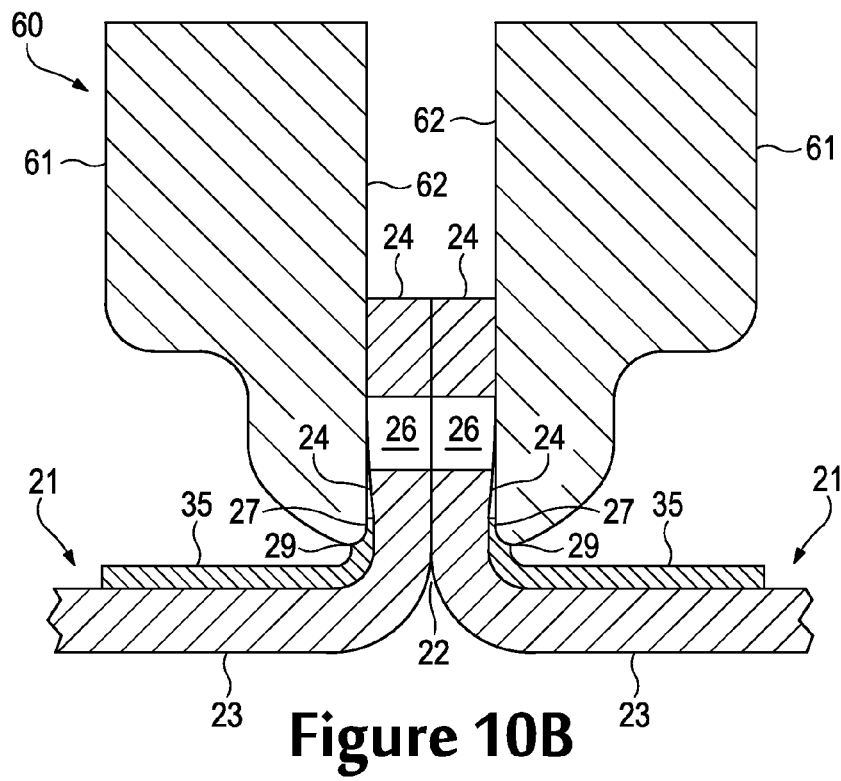
Figure 10C:
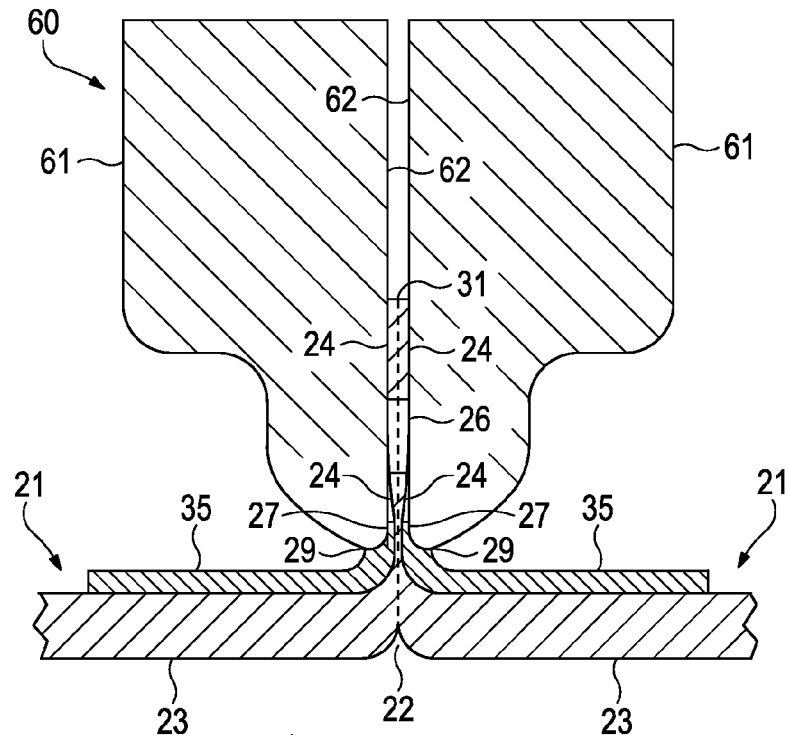
Figure 10D:
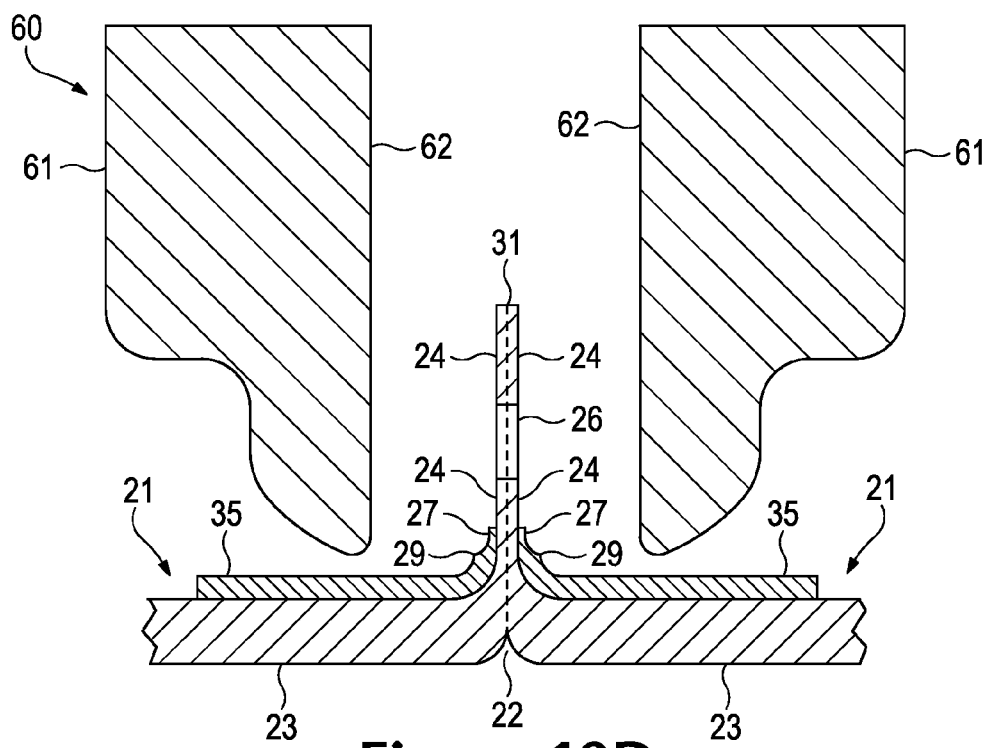
Figure 10E:
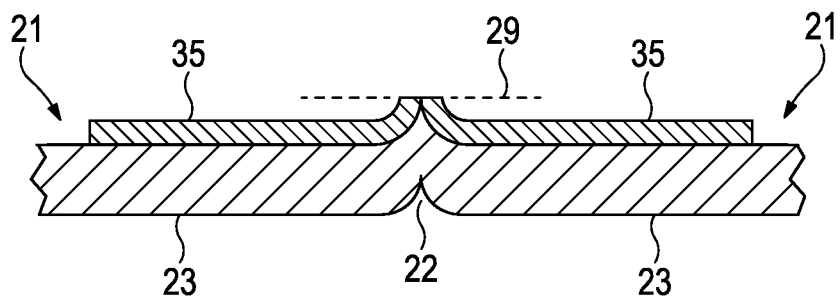

A general process for joining panels 21 with welding die 60 will now be discussed with reference to FIGS. 10A-10E. Initially, adjacent flange areas 24 from two panels 21 are located such that (a) surfaces of the flange areas 24 face each other and (b) registration apertures 26 are generally aligned, as depicted in FIG. 10A. Portions 61 of welding die 60 are also located on opposite sides of the abutting flange areas 24. Portions 61 then compress flange areas 24 together between facing surfaces 62 to cause surfaces of flange areas 24 to contact each other, as depicted in FIG. 10B. By heating flange areas 24 with welding die 60, the polymer materials within flange areas 24 melt or otherwise soften to a degree that facilitates welding between flange areas 24, as depicted in FIG. 10C, thereby forming seam 22 between panels 21. Once seam 22 is formed by bonding flange areas 24 together, die portions 61 may retract from flange areas 24, as depicted in FIG. 10D. Excess portions of flange areas 24, which may include portions that define registration apertures 26, are then trimmed or otherwise removed to complete the formation of one of seams 22, as depicted in FIG. 10E.

Figure 11:
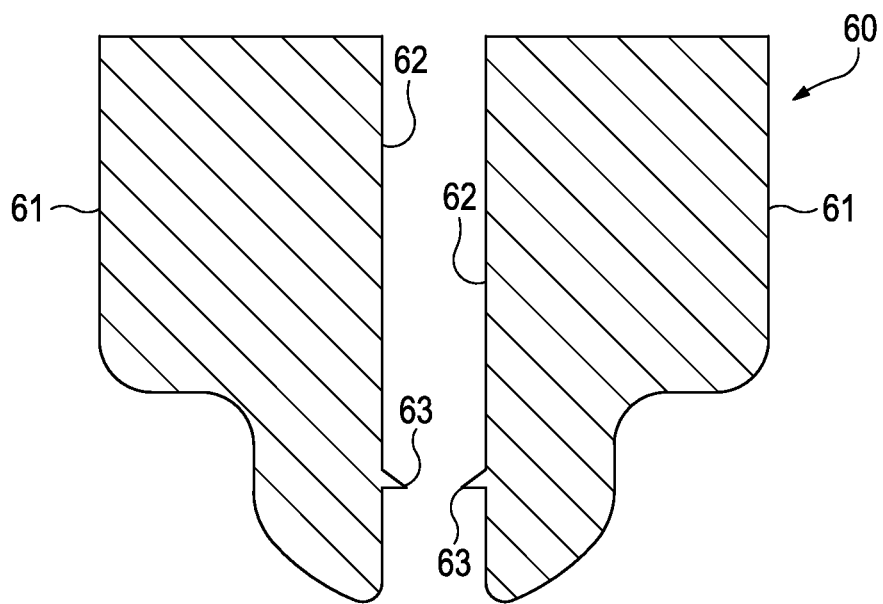
FIG. 11 is a cross-sectional view that corresponds with FIG. 9 and illustrates another configuration of the welding tool.

A variety of trimming processes may be utilized to remove the excess portions of flange areas 24. As examples, the trimming processes may include the use of a cutting apparatus, a grinding wheel, or an etching process. As another example, welding die 60 may incorporate cutting edges 63, as depicted in FIG. 11, that trim flange areas 24 during the welding process. That is, cutting edges 63 may be utilized to protrude through flange areas 24 and effectively trim flange areas 24 as portions 61 heat and compress flange areas 24 together between facing surfaces 62. Further, cutting edges 63 may compress flange areas 24 at reference line 29 such that hot-melt layer 35, which may be warm from the welding process, effectively extends across seam 22.

A portion of hot-melt layer 35 may also be activated (e.g., melted or softened) during the welding process. For example, portions 27, which may contact die portions 61 during welding may be subjected to heat and may be partially heat-activated to form a bond during the welding stage. The subsequent activation of hot-melt layer 35 is discussed in more detail below; however, an initial activation of portions 27 of hot-melt layer 35 by welding die 60 may provide additional bonding and support to seams 22.

Figure 12A:
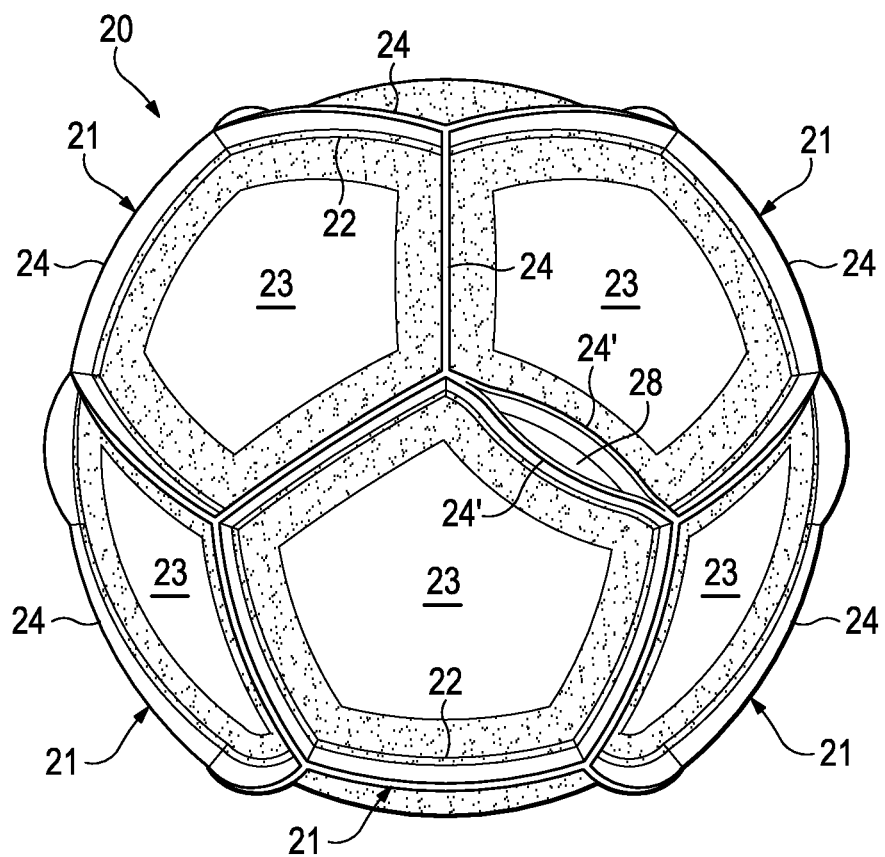
FIGS. 12A-12E are perspective views illustrating further steps in the manufacturing process for the sport ball.
Figure 12B:
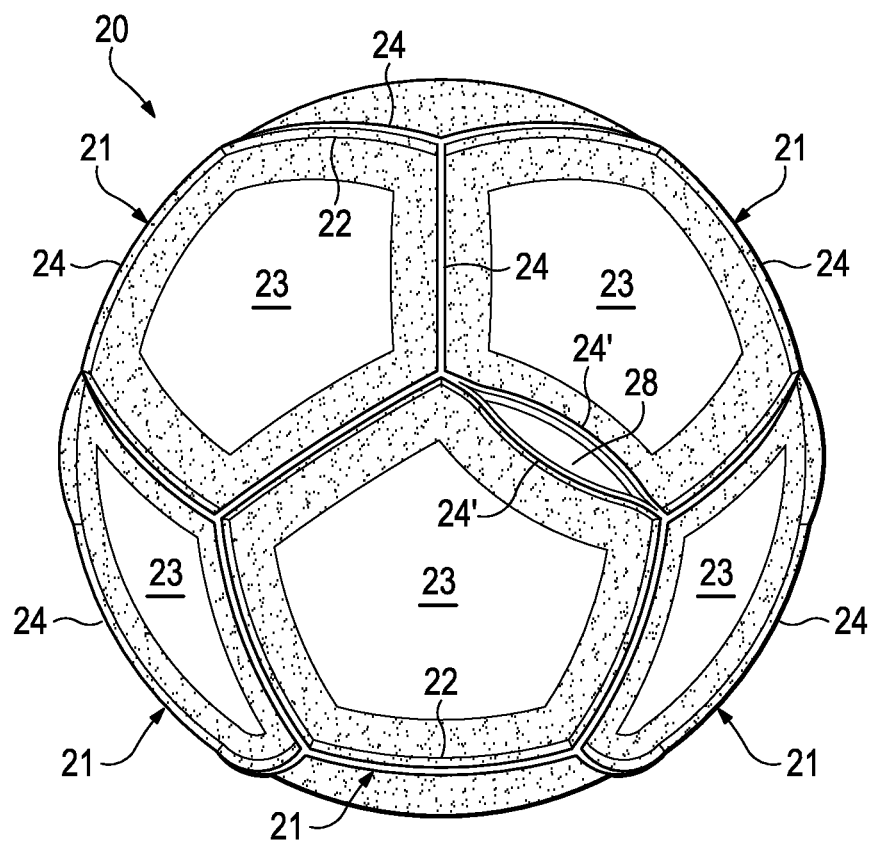

The general process of welding flange areas 24 to form seams 22 between panels 21 was generally discussed above relative to FIGS. 10A-10E. This general process may be repeatedly performed with multiple panels 21 and on multiple flange areas 24 of each panel 21 to effectively form a generally spherical or closed structure, as depicted in FIG. 12A. That is, multiple panels 21 may be welded together through the general process discussed above in order to form various seams 22 in casing 20. A similar configuration is depicted in FIG. 12B, wherein flange areas 24 are trimmed. As discussed above, the trimming or removal of flange areas 24 may occur following the welding process or may occur at the time of the welding process.

Figure 12C:
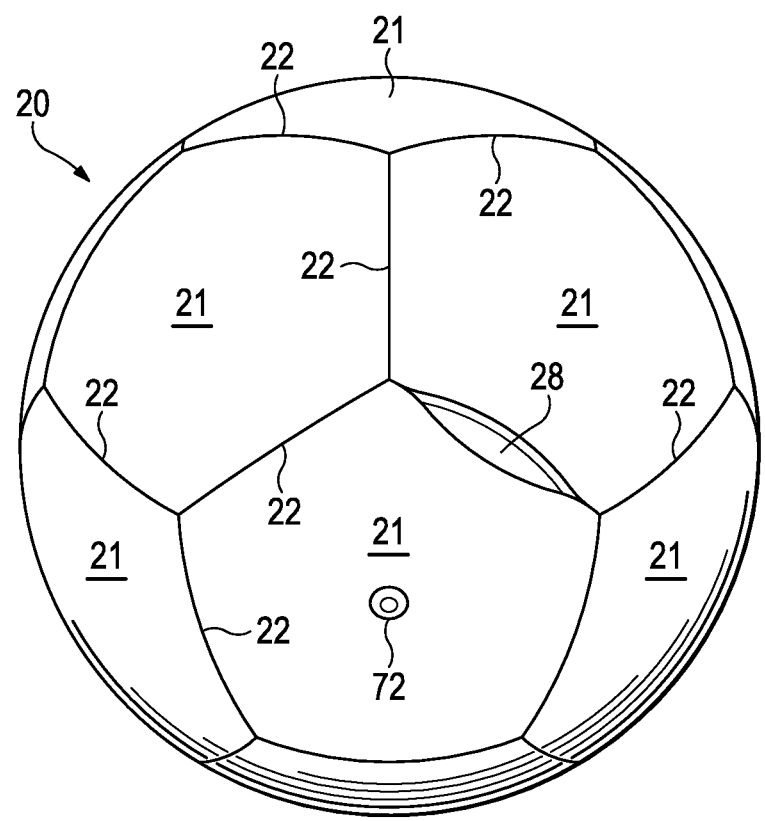

Although seams 22 are generally formed between each of flange areas 24, at least two flange areas 24 may remain unbonded to each other at this stage of the manufacturing process. Referring to FIGS. 12A and 12B, unbonded flange areas 24 are identified with reference numeral 24'. One purpose of leaving at least two flange areas 24 unbonded to each other is that casing 20 may be turned inside-out through an opening formed between the unbonded flanges 24. More particularly, the unbonded flanges 24 may be separated to form an opening 28, as depicted in FIG. 12B, and casing 20 may be reversed or turned inside-out through opening 28 to impart the configuration depicted in FIG. 12C. Whereas the trimmed portions of flange areas 24 protrude outward in FIG. 12B, reversing or turning casing 20 inside-out through opening 28 between unbonded flange areas 24 places all of flange areas 24 within casing 20. Accordingly, the trimmed flange areas 24 protrude inward rather than outward once casing 20 is reversed or turned inside-out. Moreover, turning casing 20 inside-out also places hot-melt layer 35 on the interior of casing 20. Referring back to FIG. 3, for example, an exterior of casing 20 has a generally smooth configuration, while portions of casing 20 corresponding with flange areas 24 protrude inward. Although panels 21 form an indentation on the exterior of ball 10 in the areas of seams 22, similar indentations are commonly found in game balls with stitched seams.

Figure 12D:
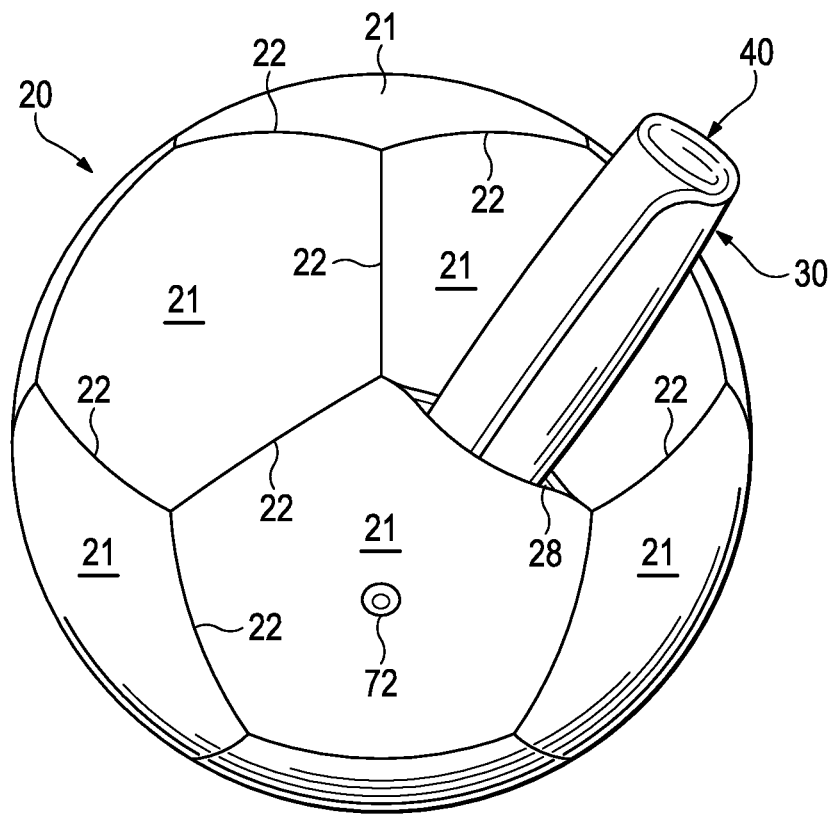
Figure 12E:
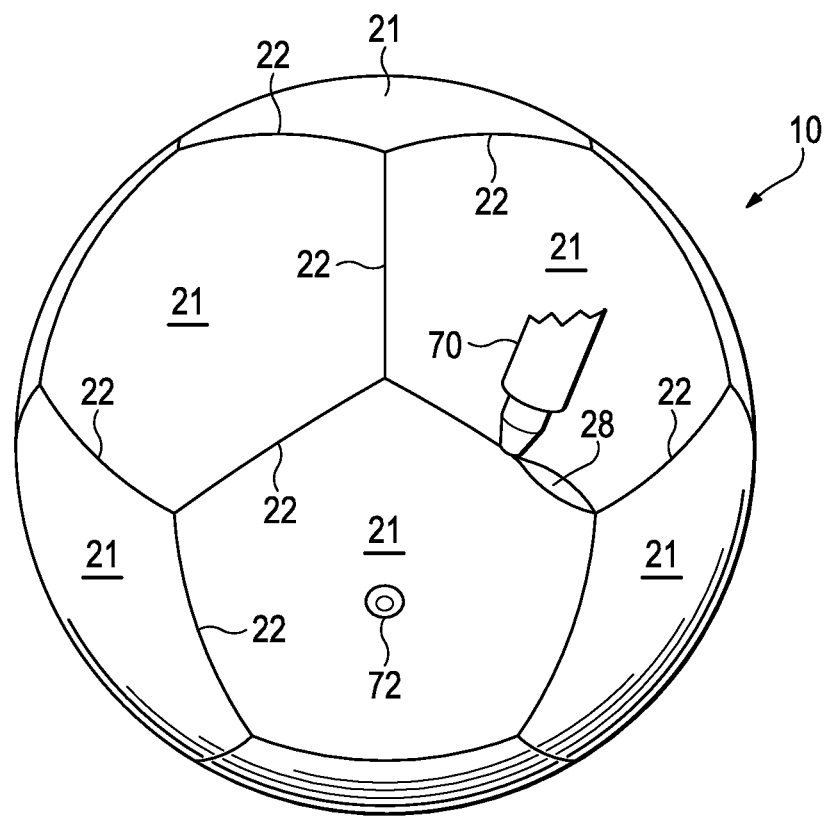

At this stage of the manufacturing process, casing 20 may be substantially formed from the welding of panels 21 and the surfaces of casing 20 oriented inward, though opening 28 may still exist and hot-melt layer 35 may be further heat-activated as set forth below. Opening 28 in casing 20 formed between unbonded flange areas 24 may now be utilized to insert intermediate layer 30 and bladder 40, as depicted in FIG. 12D. That is, intermediate layer 30 and bladder 40 may be located within casing 20 through opening 28 that was utilized to reverse or turn casing 20 inside-out. Intermediate layer 30 and bladder 40 are then properly positioned within casing 20, which may include partially inflating bladder 40 to induce contact between surfaces of intermediate layer 30 and casing 20. Additionally, a valved opening 72 of bladder 40 may be located to extend through intermediate layer 30 and casing 20, thereby being accessible from an exterior of ball 10. Once intermediate layer 30 and bladder 40 are properly positioned within casing 20, opening 28 in casing 20 formed between unbonded flange areas 24 may be sealed, as depicted in FIG. 12E. More particularly, a sealing die 70 may form a weld between the unbonded flange areas 24 to form a final seam 22 that effectively closes casing 20. As an alternative to welding, stitching or adhesives may be utilized to close casing 20.

Figure 13:
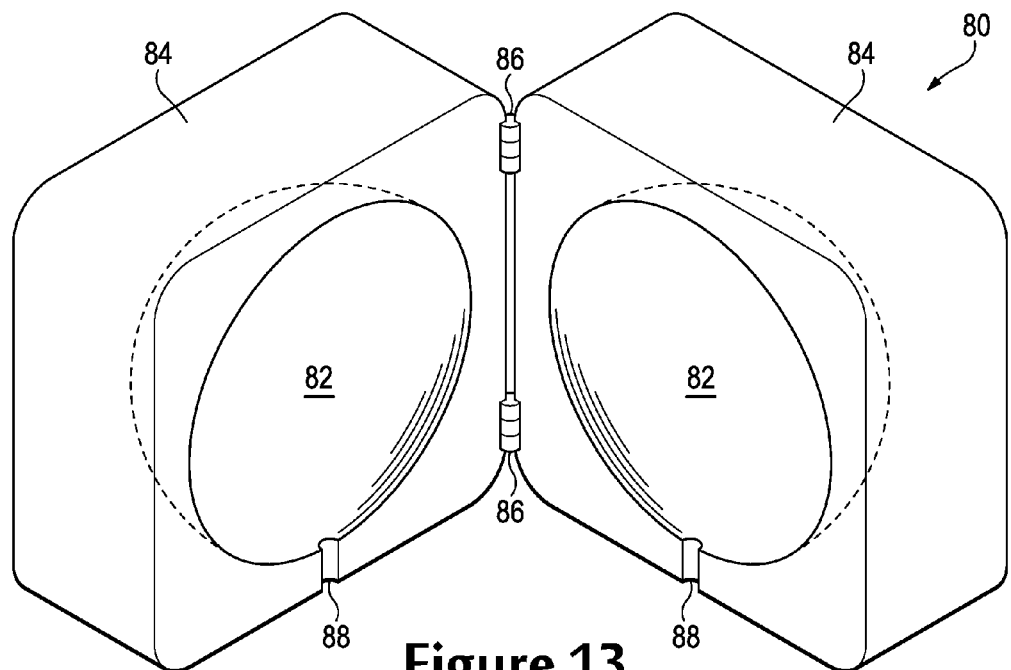
FIG. 13 is a perspective view of a manufacturing assembly in an open configuration that may be used in the manufacturing process for the sport ball.

Once ball 10 has been formed such that flange areas 24 of panels 21 have been sealed, as depicted in FIG. 12E, bladder 40 may be fully pressurized, and hot-melt layer 35 may be activated to strengthen the bond across seams 22 on the interior of the ball. FIG. 13 depicts a manufacturing assembly 80, which may be used to finish pressurization of ball 10 and to activate hot-melt layer 35.

Figure 14:
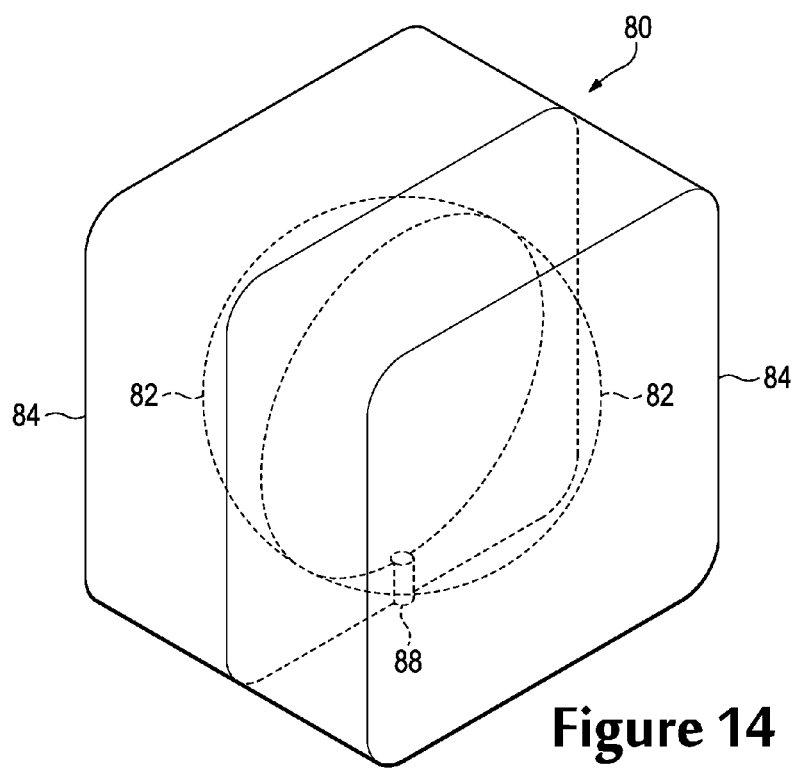
FIG. 14 is a perspective view of the manufacturing assembly in a closed configuration.

Assembly 80 may represent a full cube or other three-dimensional shape with a hollowed-out spherical cavity 82 for receiving ball 10. According to at least one embodiment, assembly 80 may be comprised of two identical, but oppositely situated, sides 84 that may be opened at hinges 86 to reveal spherical cavity 82 within. Assembly 80 may further include opening 88 to allow for insertion of a pressurization device (not shown), as well as a heat source (also not shown) for transferring heat to a ball placed in cavity 82. As shown in the embodiment of FIG. 13, cavity 82 is spherical to receive a spherically-shaped ball, e.g. ball 10. When closed, as depicted in FIG. 14, sides 84 mate in a flush manner with each other, creating spherical cavity 82 within. It should be understood, however, that assembly 80 may be constructed in a variety of alternative shapes and sizes to accommodate a variety of ball shapes and sizes.

According to an embodiment set forth herein, assembly 80 may be constructed from a variety of generally rigid materials that will not deform when subjected to stress, heat, or pressurization from within, yet will further allow for heat transfer. Examples of suitable materials for assembly 80 include various metals (e.g., steel, aluminum, titanium) and various polymer materials (e.g., thermoset polymers and thermoplastic polymers with relatively high melting temperatures), though those skilled in the art will readily identify other related or suitable materials.

Figure 15:
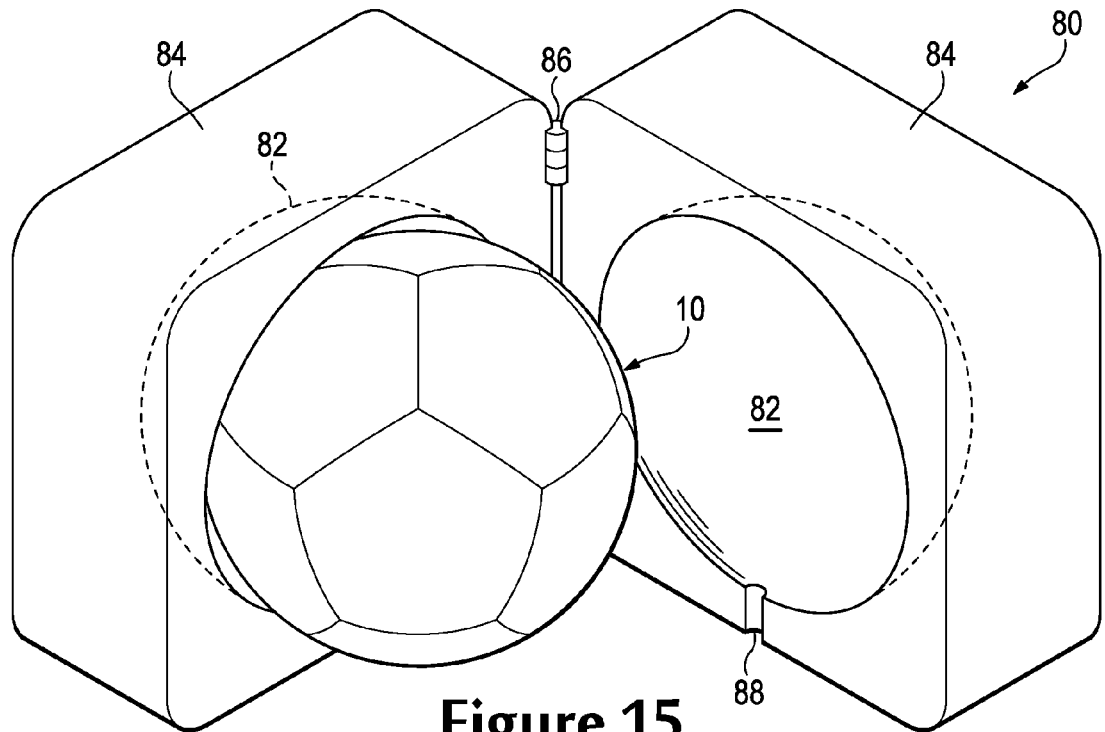
FIG. 15 is a perspective view of the sport ball being located within the manufacturing assembly.
Figure 16:
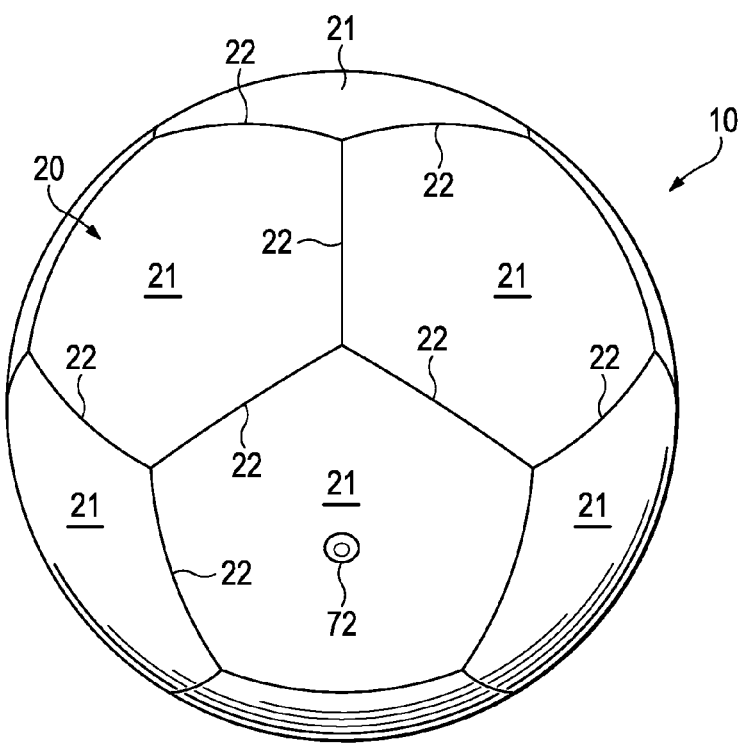
FIG. 16 is a perspective view of an embodiment of the sport ball following the manufacturing process.

As discussed above, ball 10 may be placed in assembly 80 to complete pressurization and to activate hot-melt layer 35. FIG. 15 depicts ball 10 being placed in assembly 80. Ball 10 may be placed such that valve opening 72 (not shown in FIG. 15) matches up with opening 88 of assembly 80 to allow an air source to be inserted into valve opening 72 for pressurization. According to additional embodiments, an air source may be incorporated into assembly 80. Once ball 10 is positioned in spherical cavity 82, assembly 80 may be closed as depicted in FIG. 14. Once closed, assembly 80 provides a restrictive cavity for ball 10 for full pressurization to a desired shape, and in the case of the embodiment of ball 10 and assembly 80, to a spherical shape.

Assembly 80 also allows for a heat transfer to activate hot-melt layer 35 during the pressurization process to further strengthen seams 22 and add to the overall integrity of casing 20 of ball 10. As set forth above, hot-melt layer 35 may be comprised of a thermoplastic polymer material that melts when heated and returns to a solid state when cooled sufficiently. Based upon this property of thermoplastic polymer materials, welding processes, as discussed above, may be utilized to join hot-melt layer 35 to portions of the interior side of casing 20, including portions of interior side 27 of panels 21 and across seams 22. In some circumstances, hot-melt layer 35 may also bond to portions of intermediate layer 30.

Accordingly, the welding of hot-melt layer 35 to the interior side 27 of panels 21, across seams 22, and in some cases to intermediate layer 30, may involve melting the thermoplastic polymer material of hot-melt layer 35 such that when the thermoplastic polymer material cools, it bonds to the interior side of panel 21 and across seams 22 to strengthen those portions of casing 20. Furthermore, according to additional embodiments, the thermoplastic polymer materials present in panels 21 may be infiltrated or also melted, as described above, such that the material also comingles with hot-melt layer 35 during the heat bonding process.

A variety of techniques may be utilized to activate and heat bond hot-melt layer 35 across seams 22. As will be appreciated by those skilled in the art, any technique useful for transferring heat across materials may be incorporated into assembly 80 or similar structure. Such techniques may include, but are not limited to, conduction heating, radiant heating, radio frequency (RF) heating, ultrasonic heating, and laser heating. By using heat transfer from the walls of cavity 82 across casing 20 while ball 10 is pressurized, hot-melt layer 35 may be activated across seams 22 on the interior side of casing 20 to strengthen seams 22 and ensure the integrity of the final shape of ball 10 in a fully pressurized state.

Based upon the above discussion, casing 20 may be at least partially formed by joining panels 21, which may include a hot-melt layer 35 on interior side 27, through a welding process, wherein the seams 22 between panels are subsequently sealed by heat activation of hot-melt layer 35. In comparison with other methods of joining panels, the welding process may reduce the overall mass of ball 10 and increase manufacturing efficiency, and the hot-melt bond may increase the strength and integrity of the seams 22 between panels 21 and across panels 21 or other areas of the casing 20. Once the welding process is utilized to join panels 21, an opening in casing 20 may be utilized to reverse or turn casing inside-out to place protruding areas within ball 10, thereby forming a substantially smooth exterior surface. Additionally, intermediate layer 30 and bladder 40 may be inserted through the opening in casing 20, the bladder 40 partially inflated, and casing 20 subsequently sealed. After ball 10 has been formed, partially inflated and sealed, ball 10 may be placed in manufacturing assembly 80 to complete pressurization and activate hot-melt layer 35 across seams 22.

Figure 17:
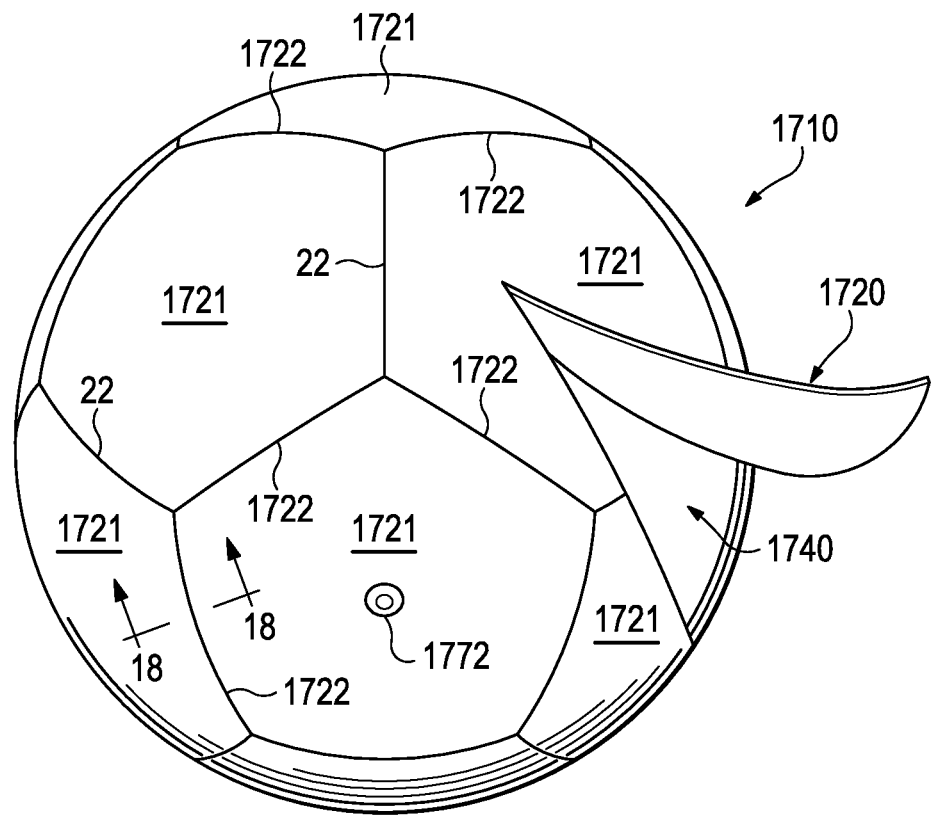
FIG. 17 is a perspective view of another configuration of a sport ball.

FIG. 17 depicts an additional embodiment of a sport ball 1710, having the general configuration of a soccer ball. As in previous embodiments, ball 1710 exhibits a layered structure having a casing 1720 that forms an exterior portion of ball 1710 and an inflatable bladder 1740 that forms an interior portion of ball 1710. In contrast to previous embodiments, an intermediate layer or restriction structure, such as intermediate layer 30 may be absent. Thus, upon pressurization of bladder 1740, ball 1710 may take on a substantially spherical shape as bladder 1740 causes bladder 40 to place an outward force upon casing 1720. Accordingly, casing 1720 restrains pressure from bladder 1740, thereby imparting a spherical shape to ball 1710, and acting as both an exterior surface and restricting layer for bladder 1740.

Figure 18:
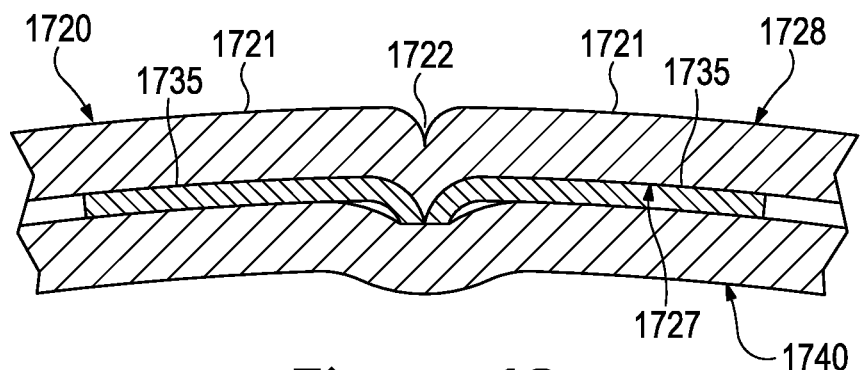
FIG. 18 is a cross-sectional view of a portion of the sport ball of FIG. 17, as defined by section line 18-18 in FIG. 17.

Casing 1720 may be similar to previously described embodiments in that it may be formed from various panels 1721 that are joined together along abutting sides or edges to form a plurality of seams 1722. As can be seen in FIG. 18, which depicts a cross-section of two joined panels 1721, each panel 1721 of the casing 1720 has an exterior side 1728 that ultimately forms the exterior of ball 1710, as well as an interior side 1727 which ultimately lies on the interior of ball 1710. And although panels 1721 are depicted as having the shapes of twelve equilateral pentagons, panels 1721 may have non-equilateral shapes, concave or convex edges, or a variety of other shapes (e.g., triangular, square, rectangular, hexagonal, trapezoidal, round, oval, non-geometrical) and number of panels that combine in a tessellation-type manner to form casing 1720. Accordingly, the configuration of casing 1720 may vary significantly.

The panels 1721 of sport ball 1710 may be joined by stitching or by a welding process as described in relation to previous embodiments. More particularly, panels 1721 are at least partially formed from a polymer material, which may be a thermoplastic polymer material, and edges of panels 1721 may be heated and bonded to each other to form seams 1722. An example of the configuration of seams 1722 is depicted in the cross-section of FIG. 18, wherein the welding process has effectively secured, bonded, or otherwise joined two of panels 1721 to each other by combining or comingling the polymer material from each of panels 1721. In some configurations, some of panels 1721 may be joined through stitching or various seams 1722 may be supplemented with stitching. As previously discussed, one advantage of using welding for establishing the seams between panels is the ability to limit the weight of a sport ball. Further, by omitting an intermediate restrictive layer as seen in the embodiment of sport ball 1710, the weight of sport ball 1710 may be limited even further.

Sport ball 1710 may also include provisions for adding strength and stability to seams 1722, such as hot-melt thermoplastic polymer layer 1735 applied to an interior side 1727 of panel 1721. Hot-melt layer 1735 may be formed as described in previously discussed embodiments, wherein the thermoplastic polymer material comprising layer 1735 melts when heated and returns to a solid state when cooled, allowing for additional bonding of the thermoplastic materials along seam 1722. Hot-melt layer 1735 may be positioned in any of the manners previously discussed and shown in FIG. 4 and FIGS. 5A-5C.

Once ball 1710 has been formed such that panels 1721 have been sealed, as depicted in FIG. 18, and bladder 1740 has been inserted in casing 1720, bladder 1740 may be fully pressurized and hot-melt layer 1735 may be activated according to the techniques described in detail in relation to FIGS. 12C-15. Accordingly, hot-melt layer 1735 may be activated to strengthen the bond across seams 1722 on the interior of the ball as previously described. It should be further noted that during the activation of hot-melt layer 1735, thermoplastic polymers present in both the hot-melt layer 1735 and bladder 1740 may additionally comingle to form a bond between layers 1720 and 1740 in addition to a bond along seams 1722.

It should be understood that sport ball 1710 may be formed from the same or similar materials as discussed with respect to previous embodiments. Sport ball 1710 may also be assembled and fully pressurized according to techniques discussed herein, while omitting intermediate layer 30. Those skilled in the art will readily appreciate the broad scope of variations and embodiments that fall within the spirit and scope of this disclosure, and will understand that the embodiment depicted in FIGS. 17-18 shall be considered exemplary.

The invention is disclosed above and in the accompanying figures with reference to a variety of configurations. The purpose served by the disclosure, however, is to provide an example of the various features and concepts related to the invention, not to limit the scope of the invention. One skilled in the relevant art will recognize that numerous variations and modifications may be made to the configurations described above without departing from the scope of the present invention, as defined by the appended claims.

The invention claimed is:

1. A method of manufacturing a sport ball, the method comprising:
    providing a plurality of casing panels, wherein each of the plurality of casing panels has an interior side having a plurality of edges;
    applying a thermoplastic polymer material to each of the plurality of casing panels to form a thermoplastic polymer material layer disposed on the interior side adjacent to the plurality of edges;
    after applying, joining adjacent ones of the plurality of casing panels together at the plurality of edges to form a plurality of seams and an inverted casing, wherein the inverted casing defines an aperture therethrough between two adjacent ones of the plurality of casing panels;
    turning the inverted casing rightside-out through the aperture;
    after turning, inserting an intermediate layer and a bladder into the aperture;
    after inserting, inflating the bladder; and
    heating the thermoplastic polymer material layer to bond the plurality of casing panels to the intermediate layer at the plurality of seams and thereby manufacture the sport ball.

2. The method of claim 1, wherein joining the plurality of edges together comprises welding the plurality of casing panels together.

3. The method of claim 1, further including, after inserting, (a) positioning the casing, the intermediate layer, and the bladder into an assembly defining an inner cavity, and (b) inflating the bladder within the inner cavity while heating the thermoplastic polymer material layer.

4. The method of claim 2, wherein a first one of the plurality of casing panels has a first edge and a second one of the plurality of casing panels has a second edge disposed adjacent to the first edge, and further wherein joining the plurality of edges together includes welding the thermoplastic polymer material layer at the first edge to the thermoplastic polymer material layer at the second edge.

5. The method of claim 1, further including, after joining the plurality of edges together, trimming the plurality of edges.

6. The method of claim 2, further including, concurrent to welding, trimming the plurality of edges.

7. The method of claim 2, wherein applying includes spraying the thermoplastic polymer material onto the interior side of each of the plurality of casing panels.

8. The method of claim 7, wherein applying includes spraying the thermoplastic polymer material onto the interior side so that the thermoplastic polymer material layer is disposed along each of the plurality of edges.

* * * * *